(12) United States Patent
Fukasawa

(10) Patent No.: US 10,698,280 B2
(45) Date of Patent: Jun. 30, 2020

(54) DISPLAY DEVICE AND METHOD OF MANUFACTURING THE SAME

(71) Applicant: Samsung Display Co., Ltd., Yongin-si, Gyeonggi-do (KR)

(72) Inventor: Takayuki Fukasawa, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 50 days.

(21) Appl. No.: 15/994,908

(22) Filed: May 31, 2018

(65) Prior Publication Data

US 2019/0129266 A1    May 2, 2019

(30) Foreign Application Priority Data

Oct. 31, 2017  (KR) .................. 10-2017-0143651

(51) Int. Cl.
| | |
|---|---|
| *G09G 3/34* | (2006.01) |
| *G02F 1/1362* | (2006.01) |
| *G02F 1/1339* | (2006.01) |
| *G02F 1/1337* | (2006.01) |
| *G09G 3/36* | (2006.01) |
| *G02F 1/1345* | (2006.01) |

(52) U.S. Cl.
CPC ...... *G02F 1/136286* (2013.01); *G02F 1/1339* (2013.01); *G02F 1/13454* (2013.01); *G02F 1/133707* (2013.01); *G09G 3/3648* (2013.01); *G02F 2001/136295* (2013.01); *G02F 2201/42* (2013.01)

(58) Field of Classification Search
CPC ......... G02F 1/136286; G02F 1/133707; G02F 1/1339; G02F 2001/136295; G02F 1/13454; G02F 2201/42; G09G 3/3648
See application file for complete search history.

(56) References Cited

U.S. PATENT DOCUMENTS

| | | | |
|---|---|---|---|
| 6,618,111 B1 | 9/2003 | Nagata et al. | |
| 8,687,139 B2 | 4/2014 | Lee et al. | |
| 9,582,031 B2 | 2/2017 | Nam et al. | |
| 2012/0033162 A1* | 2/2012 | Ahn | G02F 1/1339 349/106 |
| 2013/0016065 A1* | 1/2013 | Reynolds | G06F 3/0412 345/174 |
| 2015/0002500 A1* | 1/2015 | Choi | G02F 1/13306 345/211 |
| 2017/0160866 A1* | 6/2017 | Tsai | G06F 3/0416 |

FOREIGN PATENT DOCUMENTS

| | | |
|---|---|---|
| JP | 2005-274632 A | 10/2005 |
| JP | 2008-077029 A | 4/2008 |
| KR | 10-2013-0109350 A | 10/2013 |
| KR | 10-2015-0145827 A | 12/2015 |

* cited by examiner

*Primary Examiner* — Adam R. Giesy
(74) *Attorney, Agent, or Firm* — Lewis Roca Rothgerber Christie LLP

(57) ABSTRACT

A display device includes: a display region and a sealing region; a first substrate; a second substrate opposite to the first substrate; a sealing member in the sealing region between the first substrate and the second substrate; and a first conductive member overlapping the sealing member and passing through the first substrate and the sealing member.

20 Claims, 25 Drawing Sheets

DISPLAY DEVICE AND METHOD OF MANUFACTURING THE SAME

CROSS-REFERENCE TO RELATED APPLICATION

This application claims priority to and the benefit of Korean Patent Application No. 10-2017-0143651, filed on Oct. 31, 2017 in the Korean Intellectual Property Office (KIPO), the entire disclosure of which is incorporated by reference herein.

BACKGROUND

1. Field

Aspects of embodiments relate to electronic devices. More particularly, aspects of embodiments relate to display devices and methods of manufacturing display devices.

2. Description of the Related Art

The importance of display devices has steadily grown with recent developments in multimedia technology. As a result, a variety of display devices, such as a liquid crystal display (LCD) device, an organic light-emitting diode (OLED) display device, and the like have been developed and widespread.

The LCD device, which is one of the most widely-used flat panel display devices, may include two substrates having field-generating electrodes, e.g., pixel electrodes, a common electrode, and so forth, and a liquid crystal layer between the two substrates. The LCD device may form an electric field in the liquid crystal layer by applying voltages to the field-generating electrodes so as to determine the orientation of liquid crystal molecules in the liquid crystal layer, and may display an image by controlling the polarization of light incident thereupon using the electric field.

The LCD device may include a display region in which an image is displayed and a non-display region in which a driving circuit for transmitting signals to the display region, a sealing member, and the like are disposed. Recently, the non-display region has been narrowed to realize the LCD device having a narrow bezel.

SUMMARY

According to an aspect of embodiments of the present disclosure, a display device is provided having a narrow bezel.

According to another aspect of embodiments of the present disclosure, a method of manufacturing a display device is provided in which a conductive member connecting a driving circuit and a wiring may be formed in a narrow sealing region.

According to one or more embodiments of the present disclosure, a display device includes: a display region and a sealing region; a first substrate; a second substrate opposite to the first substrate; a sealing member in the sealing region between the first substrate and the second substrate; and a first conductive member overlapping the sealing member and passing through the first substrate and the sealing member.

In an embodiment, the display device may further include a driving circuit on a surface of the first substrate opposite to a surface facing the second substrate, the driving circuit being connected to the first conductive member.

In an embodiment, the first conductive member may be connected to a wiring on a surface of the second substrate facing the first substrate, the wiring extending from the display region to the sealing region.

In an embodiment, the wiring may be a common voltage line.

In an embodiment, the display device may further include a second conductive member overlapping the sealing member and passing through the first substrate, the sealing member, and the second substrate.

In an embodiment, the second conductive member may be connected to a wiring on a surface of the second substrate opposite to a surface facing the first substrate, the wiring extending from the display region to the sealing region.

In an embodiment, the wiring may be a touch line.

In an embodiment, the display device may further include a third conductive member overlapping the sealing member and passing through the first substrate.

In an embodiment, the third conductive member may be connected to a wiring on a surface of the first substrate facing the second substrate, the wiring extending from the display region to the sealing region.

In an embodiment, the wiring may be a gate line or a data line.

According to one or more embodiments of the present disclosure, a method of manufacturing a display device may include: forming a lower conductive member in a first substrate in a sealing region of the display device; forming a wiring on a second substrate opposite to the first substrate; forming a middle conductive member connecting the lower conductive member and the wiring in the sealing region between the first substrate and the second substrate; and forming a sealing member surrounding the middle conductive member in the sealing region between the first substrate and the second substrate.

In an embodiment, the method may further include providing a driving circuit connected to the lower conductive member on a surface of the first substrate opposite to a surface facing the second substrate.

In an embodiment, forming the lower conductive member may include forming a through hole in the first substrate in the sealing region; and filling the through hole with a conductive material.

In an embodiment, the through hole may be formed by a femtosecond laser.

In an embodiment, forming the middle conductive member may include connecting the lower conductive member and the wiring with a conductive line.

In an embodiment, forming the middle conductive member may include forming bumps on the lower conductive member and the wiring, respectively; and contacting the bumps to each other.

In an embodiment, forming the middle conductive member may include forming a conductive structure in the sealing region between the first substrate and the second substrate; and etching the conductive structure so as to form the middle conductive member.

In an embodiment, the method may further include forming an upper conductive member in the second substrate in the sealing region.

In an embodiment, forming the upper conductive member may include forming a through hole in the second substrate in the sealing region; and filling the through hole with a conductive material.

In an embodiment, the through hole may be formed by a femtosecond laser.

According to an aspect of embodiments of the present disclosure, the display device may include the conductive member overlapping the sealing member in the sealing region and passing through the first substrate and the sealing member. Accordingly, the driving circuit and the wiring may be connected by the conductive member, and the display device may have a narrow bezel.

According to another aspect of embodiments of the present disclosure, in the method of manufacturing the display device, the through hole may be formed in the substrate by the femtosecond laser. Accordingly, a plurality of conductive members may be formed in the relatively narrow sealing region.

BRIEF DESCRIPTION OF THE DRAWINGS

Some illustrative, non-limiting embodiments will be more clearly understood from the following description, taken in conjunction with the accompanying drawings.

DETAILED DESCRIPTION

Herein, display devices and methods of manufacturing the display devices in accordance with some embodiments of the present disclosure will be described in further detail with reference to the accompanying drawings.

Figure 1:
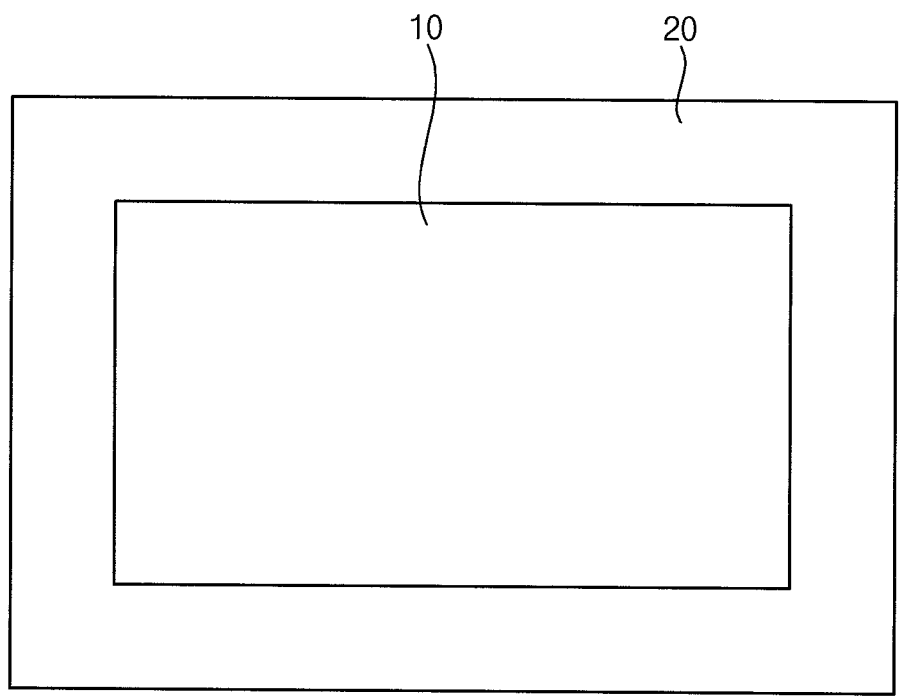
FIG. 1 is a plan view illustrating a display device according to an embodiment.

FIG. 1 is a plan view illustrating a display device according to an embodiment.

Referring to FIG. 1, a display device according to an embodiment may include a display region 10 and a sealing region 20. An image may be displayed at the display region 10. A plurality of pixels may be disposed in the display region 10, and light emitted from the pixels may form the image.

The sealing region 20 may be located adjacent to the display region 10. In an embodiment, the sealing region 20 may be disposed outside the display region 10 while surrounding a perimeter of the display region 10. The sealing region 20 may be a non-display region on which an image is not displayed.

FIG. 1 illustrates an embodiment in which the display device has a quadrangular shape in a plan view; however, a planar shape of the display device is not limited thereto. The display device may have any of other planar shapes, such as a star shape, a heart shape, a triangle shape, or the like.

Herein, a display device according to an embodiment will be described in further detail with reference to FIGS. 2 to 4.

Figure 2:
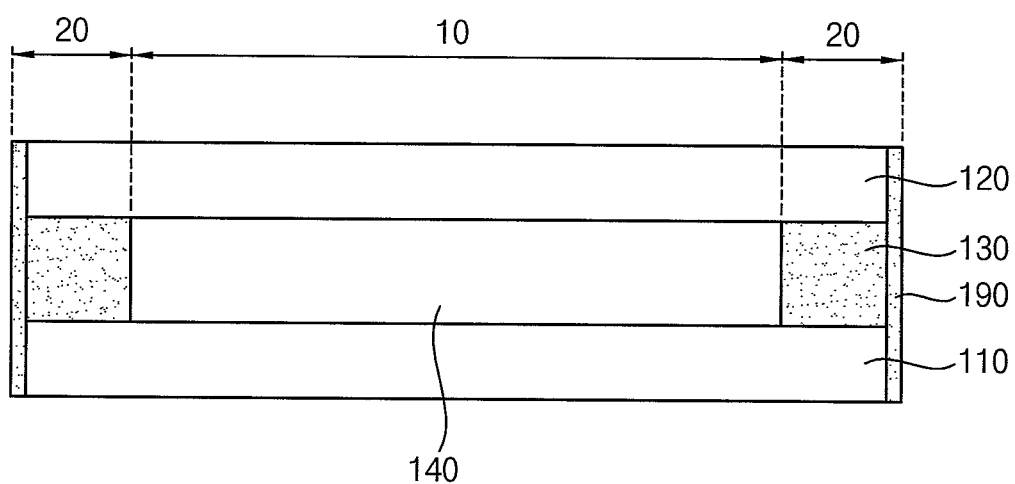
FIG. 2 is a cross-sectional view illustrating the display device in FIG. 1.
Figure 3:
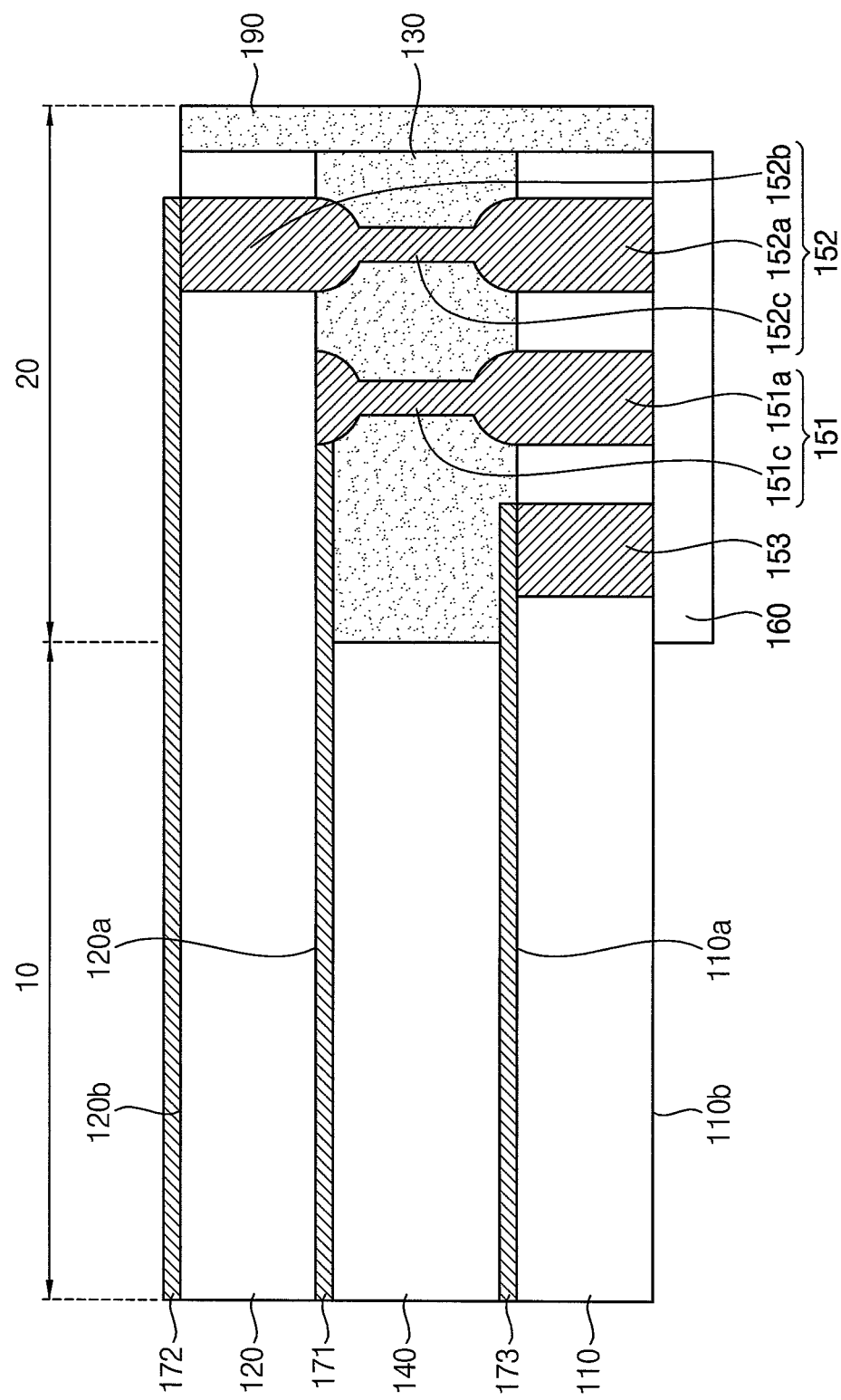
FIG. 3 is an enlarged partial cross-sectional view illustrating the display device in FIG. 2.

FIG. 2 is a cross-sectional view illustrating the display device in FIG. 1; and FIG. 3 is an enlarged partial cross-sectional view illustrating the display device in FIG. 2.

Referring to FIGS. 2 and 3, a display device according to an embodiment may include a first substrate 110, a second substrate 120, a sealing member 130, a display member 140, a driving circuit 160, and conductive members 151, 152, and 153.

The first substrate 110 and the second substrate 120 may be opposite to each other. The first substrate 110 may have a first surface 110a facing the second substrate 120 and a second surface 110b opposite to the first surface 110a. For example, the first surface 110a of the first substrate 110 may be an upper surface, and the second surface 110b of the first substrate 110 may be a lower surface.

The second substrate 120 may have a first surface 120a facing the first substrate 110 and a second surface 120b opposite to the first surface 120a. For example, the first surface 120a of the second substrate 120 may be a lower surface, and the second surface 120b of the second substrate 120 may be an upper surface. In an embodiment, the first substrate 110 may include a thin film transistor and a pixel electrode, and the second substrate 120 may include a common electrode.

The display member 140 may be disposed in the display region 10 between the first substrate 110 and the second substrate 120. In an embodiment, when the display device is a liquid crystal display device, the display member 140 may include a liquid crystal layer.

The sealing member 130 may be disposed in the sealing region 20 between the first substrate 110 and the second substrate 120. For example, the sealing member 130 may contact the first surface 110a of the first substrate 110 and the first surface 120a of the second substrate 120 so as to encapsulate the display member 140.

In an embodiment, the display device may further include an external sealing member 190. The external sealing member 190 may contact a side surface between the first surface 110a and the second surface 110b of the first substrate 110 and a side surface between the first surface 120a and the second surface 120b of the second substrate 120 so as to encapsulate the side surface of the first substrate 110 and the side surface of the second substrate 120.

Wirings 171, 172, and 173 may be formed on the first substrate 110 and the second substrate 120. In an embodiment, a first wiring 171 may be formed on the first surface 120a of the second substrate 120. The first wiring 171 may extend from the display region 10 to the sealing region 20. In an embodiment, the first wiring 171 may be a common voltage line. The first wiring 171 may be connected to the common electrode, and may transmit a common voltage.

A second wiring 172 may be formed on the second surface 120b of the second substrate 120. The second wiring 172 may extend from the display region 10 to the sealing region 20. In an embodiment, the second wiring 172 may be a touch line. The second wiring 172 may be connected to a touch sensing member, and may transmit a driving signal or a sensing signal. In another embodiment, the second wiring 172 may be connected to a fingerprint recognition member.

A third wiring 173 may be formed on the first surface 110a of the first substrate 110. The third wiring 173 may extend from the display region 10 to the sealing region 20.

In an embodiment, the third wiring 173 may be a gate line or a data line. The third wiring 173 may be connected to the thin film transistor, and may transmit a gate signal or a data voltage.

The driving circuit 160 may be electrically connected to the first wiring 171, the second wiring 172, and the third wiring 173. In an embodiment, the driving circuit 160 may be disposed on the second surface 110b of the first substrate 110. Accordingly, an increase of a width of a bezel of the display device may be prevented or substantially prevented. The driving circuit 160 may generate the common voltage, the driving signal, the sensing signal, the gate signal, and the data voltage, and may transmit those to the wirings 171, 172, and 173.

The conductive members 151, 152, and 153 may connect the driving circuit 160 to the wirings 171, 172, and 173. The conductive members 151, 152, and 153 may include a first conductive member 151, a second conductive member 152, and a third conductive member 153.

The first conductive member 151 may connect the driving circuit 160 to the first wiring 171. The first conductive member 151 may overlap the sealing member 130, and may pass through the first substrate 110 and the sealing member 130. The first conductive member 151 may contact the first wiring 171. The first conductive member 151 may transmit the common voltage transmitted from the driving circuit 160 to the first wiring 171. The display device according to an embodiment may include a plurality of first conductive members 151.

The first conductive member 151 may include a first lower conductive member 151a passing through the first substrate 110 and a first middle conductive member 151c passing through the sealing member 130. In an embodiment, a width of the first lower conductive member 151a may be different from a width of the first middle conductive member 151c. For example, the width of the first middle conductive member 151c may be less than the width of the first lower conductive member 151a.

The second conductive member 152 may connect the driving circuit 160 to the second wiring 172. The second conductive member 152 may overlap the sealing member 130, and may pass through the first substrate 110, the sealing member 130, and the second substrate 120. The second conductive member 152 may contact the second wiring 172. The second conductive member 152 may transmit the driving signal or the sensing signal transmitted from the driving circuit 160 to the second wiring 172. The display device according to an embodiment may include a plurality of second conductive members 152.

The second conductive member 152 may include a second lower conductive member 152a passing through the first substrate 110, an upper conductive member 152b passing through the second substrate 120, and a second middle conductive member 152c passing through the sealing member 130. In an embodiment, a width of the second lower conductive member 152a may be substantially the same as a width of the upper conductive member 152b, and the width of the second lower conductive member 152a may be different from a width of the second middle conductive member 152c. For example, the width of the second middle conductive member 152c may be less than the width of the second lower conductive member 152a.

The third conductive member 153 may connect the driving circuit 160 to the third wiring 173. The third conductive member 153 may overlap the sealing member 130, and may pass through the first substrate 110. The third conductive member 153 may contact the third wiring 173. The third conductive member 153 may transmit the gate signal or the data voltage transmitted from the driving circuit 160 to the third wiring 173. The display device according to an embodiment may include a plurality of third conductive members 153.

In an embodiment, the driving circuit 160 may directly contact the conductive members 151, 152, and 153. In another embodiment, the display device may further include a printed circuit board. The driving circuit 160 may be disposed on the printed circuit board, and may be connected to the conductive members 151, 152, and 153 through the printed circuit board.

In an embodiment, the display device may further include a backlight unit. The backlight unit may be provided as a direct type backlight unit. For example, the backlight unit may be disposed on the second surface 110b of the first substrate 110, and may emit light to the first substrate 110. Accordingly, an increase of a width of a bezel of the display device may be prevented or substantially prevented.

Figure 4:
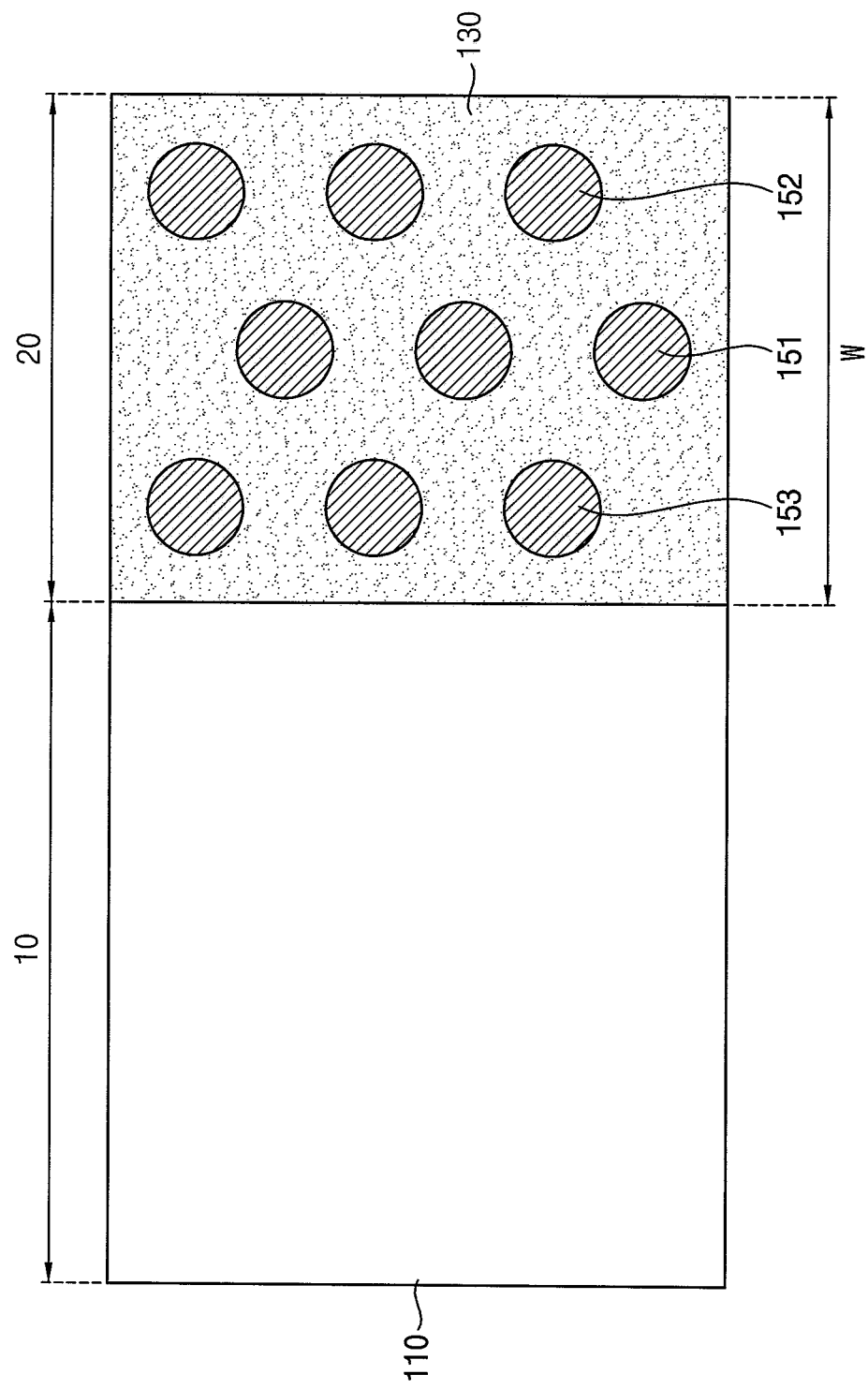
FIG. 4 is a plan view illustrating a sealing member and conductive members included in the display device in FIG. 3.

FIG. 4 is a plan view illustrating a sealing member and conductive members included in the display device in FIG. 3.

Referring to FIG. 4, the sealing member 130 may be disposed in the sealing region 20, and the conductive members 151, 152, and 153 may overlap the sealing member 130. In an embodiment, a width W of the sealing member 130 may be less than about 50 μm. The sealing member 130 may be located in a bezel of the display device, and in order to narrowly form the bezel of the display device, the smaller width W of the sealing member 130 may be more advantageous.

In an embodiment, each of the conductive members 151, 152, and 153 may have a circular shape in a plan view. In an embodiment, a diameter of each of the conductive members 151, 152, and 153 may be less than about 30 μm, and, in an embodiment, less than about 10 μm. However, a planar shape of each of the conductive members 151, 152, and 153 is not limited thereto, and each of the conductive members 151, 152, and 153 may have any of various polygonal planar shapes.

In an embodiment, the conductive members 151, 152, and 153 may be alternately disposed with respect to each other. For example, the first conductive member 151 and the second conductive member 152 may be alternately disposed with respect to each other in a width direction parallel to the width W of the sealing member 130, and the first conductive member 151 and the third conductive member 153 may be alternately disposed with respect to each other in the width direction. Accordingly, although the width W of the sealing member 130 is relatively small, a relatively large number of the conductive members 151, 152, and 153 may be disposed while overlapping the sealing member 130. However, the present invention is not limited thereto, and the conductive members 151, 152, and 153 may be disposed aligned to each other in the width direction.

In the display device according to an embodiment, the conductive member 151, 152, and 153 connecting the driving circuit 160 and the wirings 171, 172, and 173 may overlap the sealing member 130 and, therefore, the display device may have a narrow bezel.

Herein, a method of manufacturing a display device such as the display device illustrated in FIG. 3 will be described in further detail with reference to FIGS. 5 to 14.

FIGS. 5 to 14 are cross-sectional views illustrating a method of manufacturing a display device, according to an embodiment.

A method of manufacturing a display device according to an embodiment may include forming a lower conductive member in a first substrate in a sealing region of the display device, forming a wiring on a second substrate, forming a middle conductive member in the sealing region between the first substrate and the second substrate, and forming a sealing member surrounding the middle conductive member.

Figure 5:
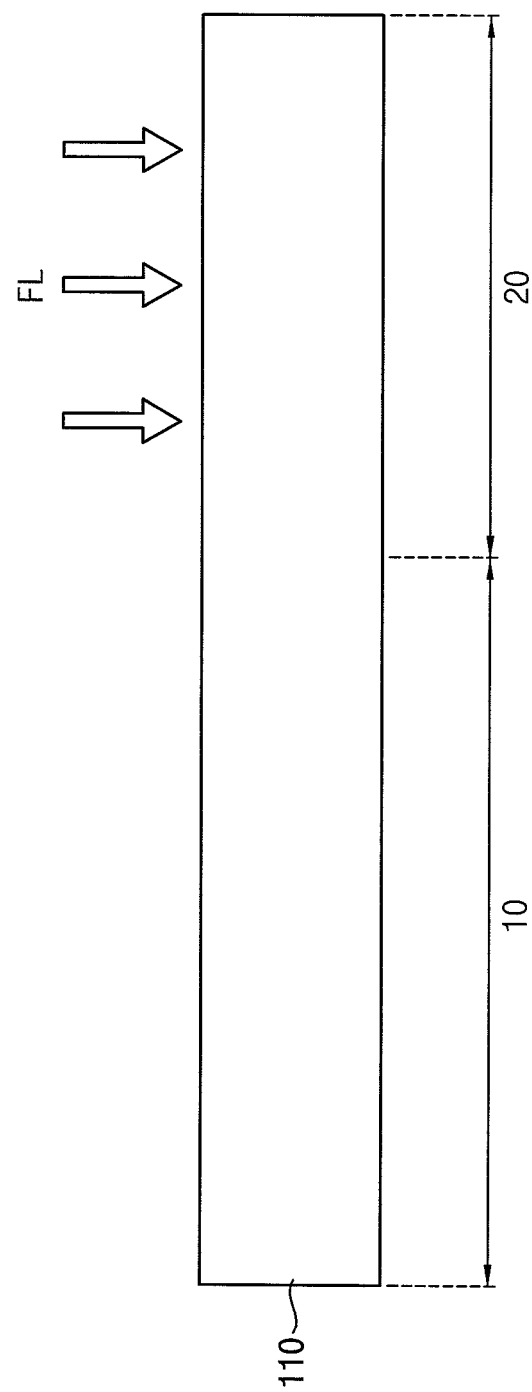
FIGS. 5 to 14 are cross-sectional views illustrating a method of manufacturing a display device, according to an embodiment.
Figure 6:
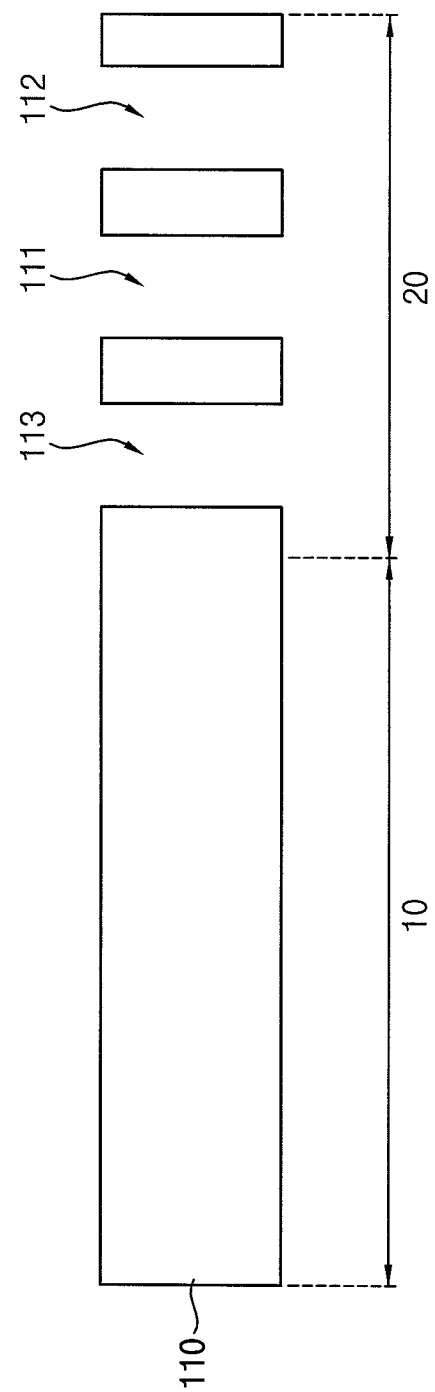
Figure 7:
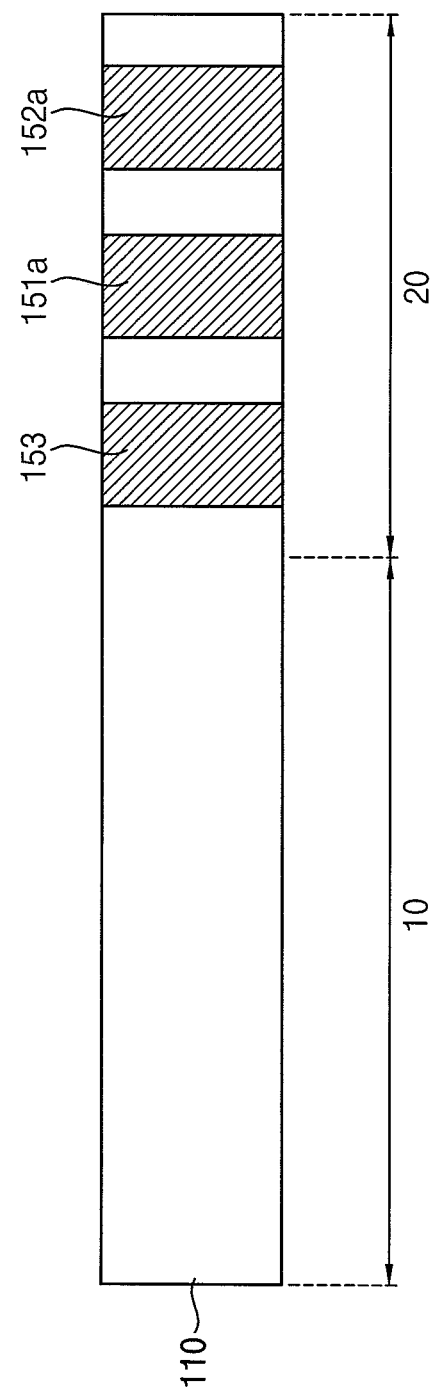

Referring to FIGS. 5, 6, and 7, the lower conductive members 151a and 152a may be formed in the sealing region 20 of the first substrate 110. In an embodiment, the first lower conductive member 151a, the second lower conductive member 152a, and the third conductive member 153 may be formed in the sealing region 20 of the first substrate 110. First, the first substrate 110 including an insulation material, such as glass, plastic, etc., may be prepared. In an embodiment, a thickness of the first substrate 110 may be about 500 µm.

Referring to FIGS. 5 and 6, a first through hole 111, a second through hole 112, and a third through hole 113 may be formed in the sealing region 20 of the first substrate 110.

In order to form the through holes 111, 112, and 113 in the sealing region 20 of the first substrate 110, a laser FL may be irradiated at the sealing region 20 of the first substrate 110.

In an embodiment, the through holes 111, 112, and 113 may be formed by a femtosecond laser. The through holes 111, 112, and 113 having a small diameter may be formed by using the femtosecond laser.

In an embodiment, a diameter of each of the through holes 111, 112, and 113 may be less than about 30 µm, and, in an embodiment, less than about 10 µm. In an embodiment, a distance between adjacent through holes 111, 112, and 113 may be less than about 100 µm. For example, a distance between the first through hole 111 and the second through hole 112 adjacent to each other and a distance between the first through hole 111 and the third through hole 113 adjacent to each other may be less than about 100 µm.

Referring to FIG. 7, the through holes 111, 112, and 113 may be filled with a conductive material. In an embodiment, the through holes 111, 112, and 113 may be filled with silver (Ag). For example, the through holes 111, 112, and 113 may be filled by using Ag paste. Accordingly, the first lower conductive member 151a, the second lower conductive member 152a, and the third conductive member 153 may be formed in the first through hole 111, the second through hole 112, and the third through hole 113, respectively. The first lower conductive member 151a and the second lower conductive member 152a may be portions of the first conductive member 151 and the second conductive member 152 illustrated in FIG. 3, respectively.

Figure 8:
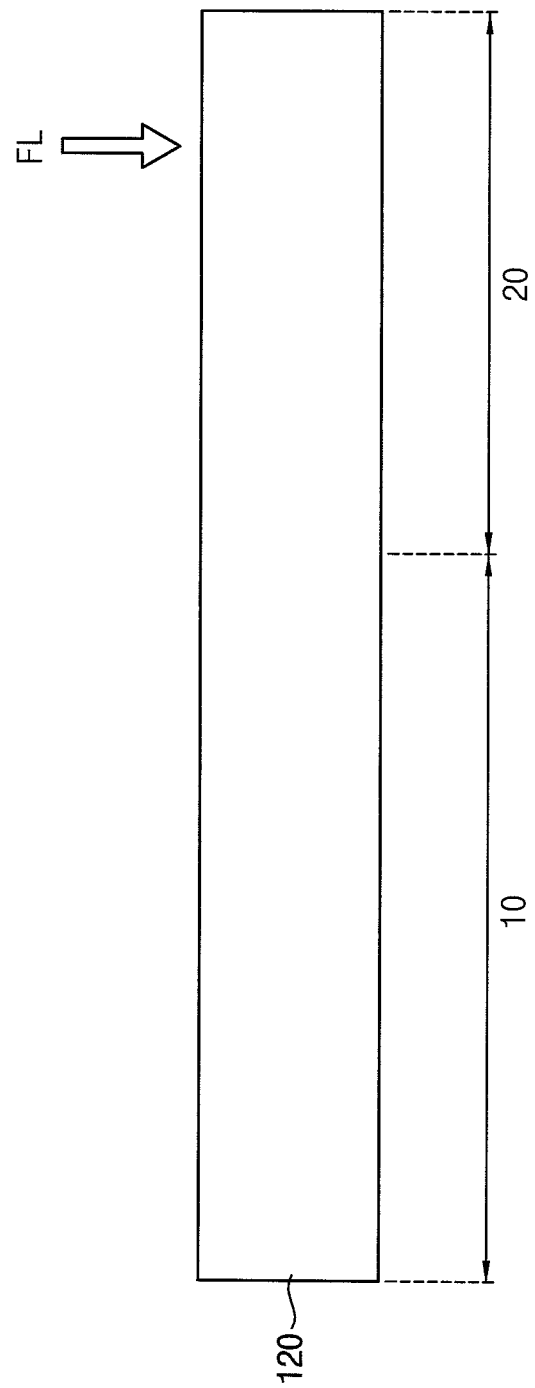
Figure 9:
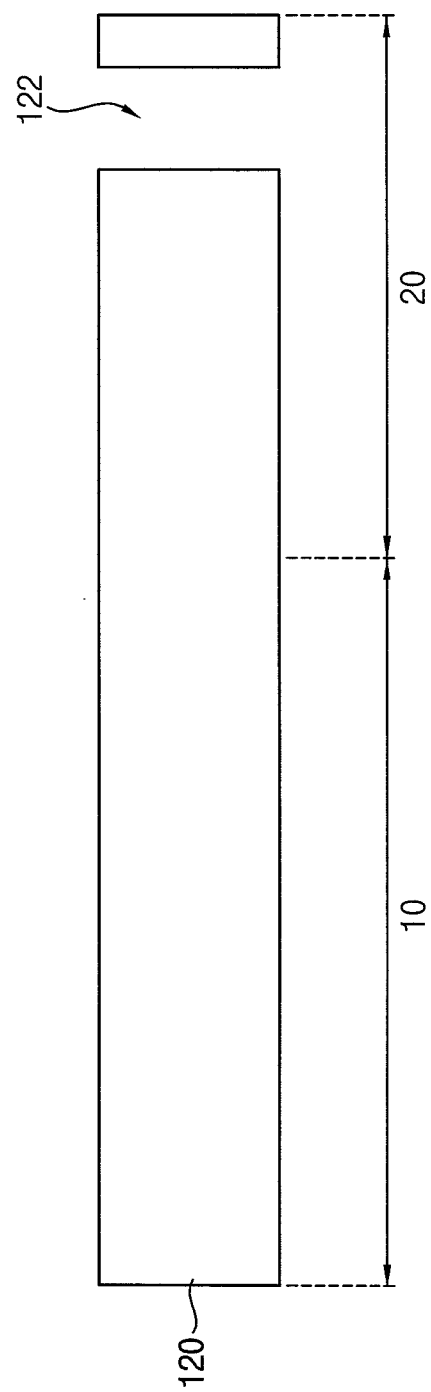
Figure 10:
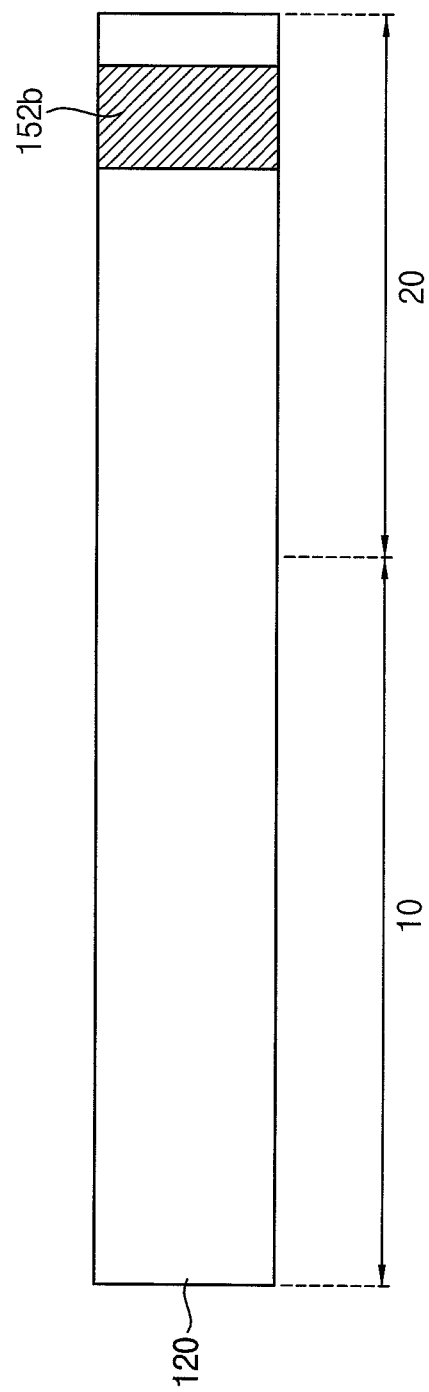

Referring to FIGS. 8, 9, and 10, the upper conductive member 152b may be formed in a region of the second substrate 120 corresponding to the sealing region 20. First, the second substrate 120 including an insulation material, such as glass, plastic, etc., may be prepared. In an embodiment, a thickness of the second substrate 120 may be about 500 µm.

Referring to FIGS. 8 and 9, a fourth through hole 122 may be formed in a region of the second substrate 120 corresponding to the sealing region 20.

In order to form the fourth through hole 122 in the region of the second substrate 120 corresponding to the sealing region 20, a laser FL may be irradiated at the region of the second substrate 120 corresponding to the sealing region 20.

In an embodiment, the fourth through hole 122 may be formed by a femtosecond laser. The fourth through hole 122 having a small diameter may be formed by using the femtosecond laser. In an embodiment, a diameter of the fourth through hole 122 may be less than about 30 µm, and, in an embodiment, less than about 10 µm.

Referring to FIG. 10, the fourth through hole 122 may be filled with a conductive material. In an embodiment, the fourth through hole 122 may be filled with silver (Ag). For example, the fourth through hole 122 may be filled by using Ag paste. Accordingly, the upper conductive member 152b may be formed in the fourth through hole 122. The upper conductive member 152b may be a portion of the second conductive member 152 illustrated in FIG. 3.

Figure 11:
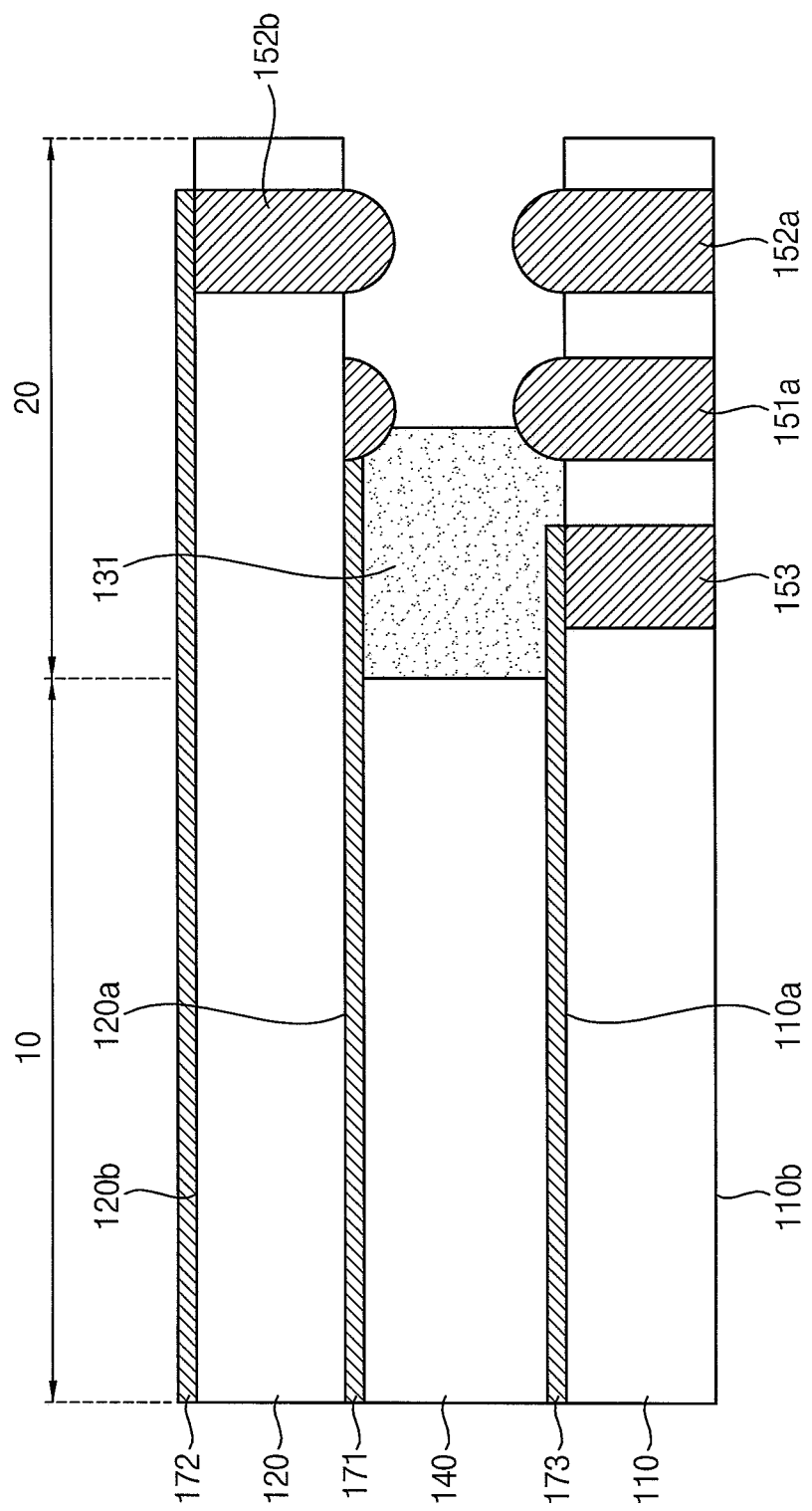

Referring to FIG. 11, the wirings 171, 172, and 173 may be formed on the second substrate 120 and the first substrate 110, and the second substrate 120 may be disposed opposite to the first substrate 110. Further, a first preliminary sealing member 131 may be formed in the sealing region 20 between the first substrate 110 and the second substrate 120, and the display member 140 may be formed in the display region 10 between the first substrate 110 and the second substrate 120.

The wirings 171, 172, and 173 may be formed on the first substrate 110 and the second substrate 120. In an embodiment, the first wiring 171 may be formed on the first surface 120a of the second substrate 120 facing the first substrate 110, the second wiring 172 may be formed on the second surface 120b of the second substrate 120 opposite to the first surface 120a, and the third wiring 173 may be formed on the first surface 110a of the first substrate 110 facing the second substrate 120. The first wiring 171, the second wiring 172, and the third wiring 173 may extend from the display region 10 to the sealing region 20.

The first preliminary sealing member 131 may be formed in the sealing region 20 between the first substrate 110 and the second substrate 120. The first preliminary sealing member 131 may be a portion of the sealing member 130 illustrated in FIG. 3. For example, the first preliminary sealing member 131 may be formed of an organic material, such as polyimide (PI). In an embodiment, the first preliminary sealing member 131 may cover the third conductive member 153, and may expose at least a portion of the first lower conductive member 151a and at least a portion of an end of the first wiring 171.

The display member 140 may be formed in the display region 10 between the first substrate 110 and the second substrate 120. In an embodiment, the display member 140 may be formed after the formation of the first preliminary sealing member 131. For example, a liquid crystal may be injected in the display region 10 between the first substrate 110 and the second substrate 120. In another embodiment, the display member 140 may be formed after a completion of forming the sealing member 130.

In an embodiment, bumps may be formed on the first substrate 110 and the second substrate 120. For example, bumps may be formed on the first lower conductive member 151a and the second lower conductive member 152a on the first surface 110a of the first substrate 110, and bumps may be formed on the end of the first wiring 171 and the upper conductive member 152b on the first surface 120a of the second substrate 120. In another embodiment, the bumps may not be formed.

Figure 12:
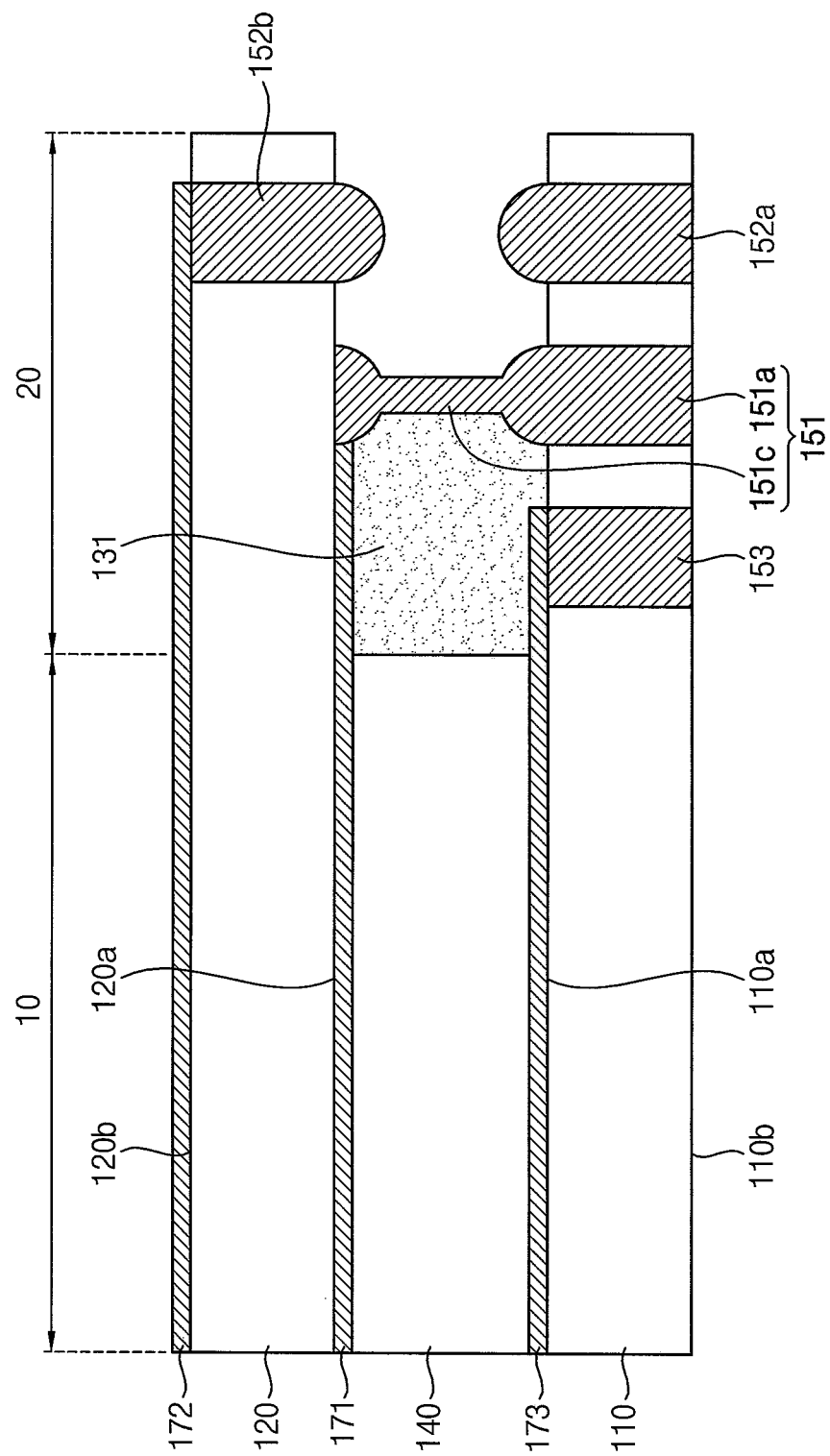
Figure 13:
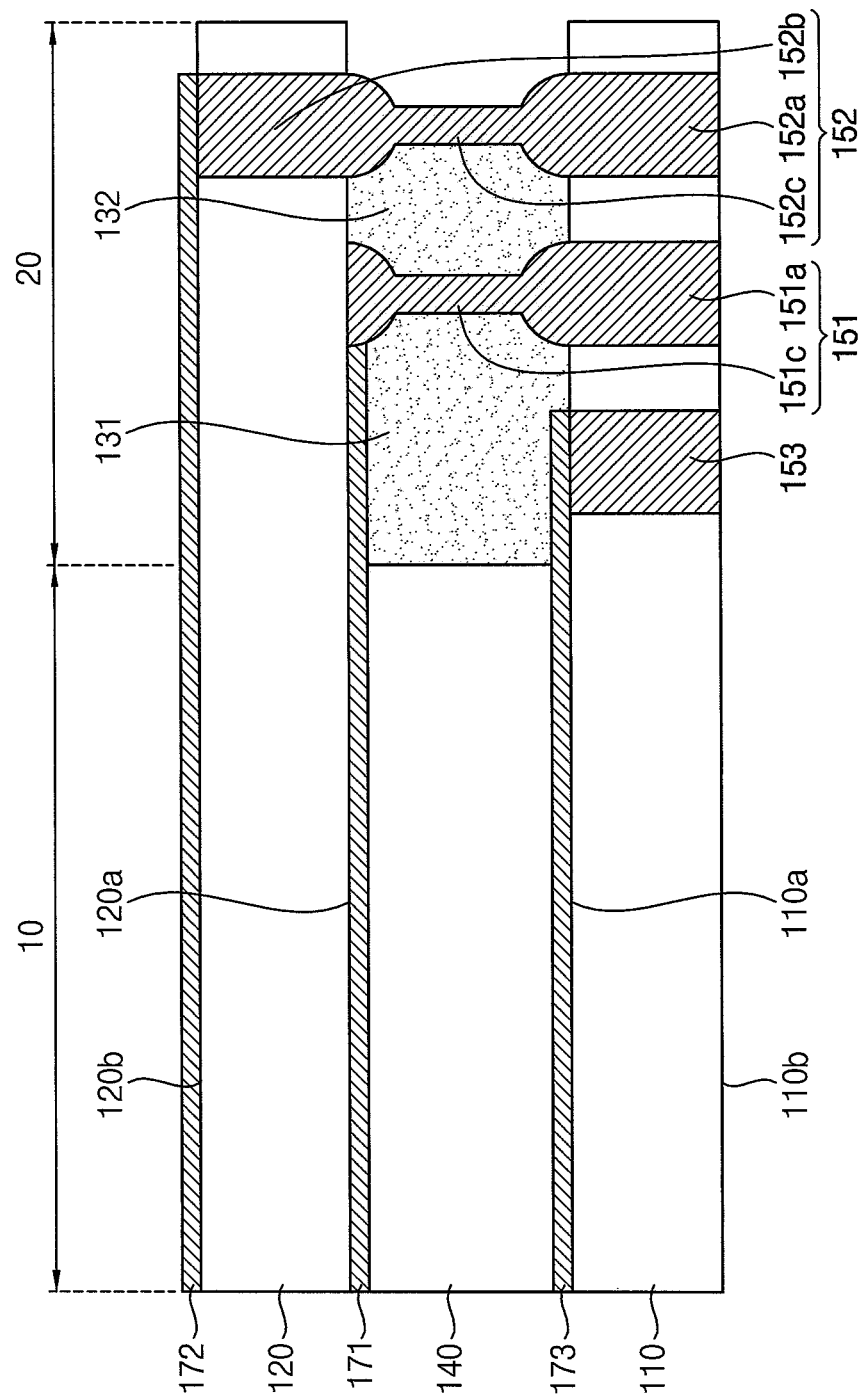

Referring to FIGS. 12 and 13, the middle conductive members 151c and 152c respectively connecting the lower conductive members 151a and 152a and the wirings 171 and 172 may be formed in the sealing region 20 between the first substrate 110 and the second substrate 120. For example, the first middle conductive member 151c connecting the first lower conductive member 151a and the first wiring 171 and the second middle conductive member 152c connecting the second lower conductive member 152a and the second wiring 172 while being in contact with the upper conductive member 152b may be formed.

Referring to FIG. 12, a first conductive line connecting the first lower conductive member 151a and the first wiring 171 may be formed. In an embodiment, the first conductive line may be in contact with the bump formed on the first lower conductive member 151a and the bump formed on the end of the first wiring 171. In this case, the first middle conductive member 151c may include the first conductive line and the bumps disposed at opposite ends thereof. For example, the first conductive line may be formed by an inkjet method, a nano-wire filling method, or the like. According to the formation of the first middle conductive member 151c, the first conductive member 151 including the first lower conductive member 151a and the first middle conductive member 151c may be formed.

Referring to FIG. 13, a second preliminary sealing member 132 may be formed in the sealing region 20 between the first substrate 110 and the second substrate 120, and a second conductive line connecting the second lower conductive member 152a and the upper conductive member 152b may be formed. The second preliminary sealing member 132 may be a portion of the sealing member 130. For example, the second preliminary sealing member 132 may be formed of an organic material, such as polyimide (PI). The second preliminary sealing member 132 may expose at least a portion of the second lower conductive member 152a and at least a portion of the upper conductive member 152b.

In an embodiment, the second conductive line may be in contact with the bump formed on the second lower conductive member 152a and the bump formed on the upper conductive member 152b. In this case, the second middle conductive member 152c may include the second conductive line and the bumps disposed at opposite ends thereof. For example, the second conductive line may be formed by an inkjet method, a nano-wire filling method, or the like. According to the formation of the second middle conductive member 152c, the second conductive member 152 including the second lower conductive member 152a, the upper conductive member 152b, and the second middle conductive member 152c may be formed.

Figure 14:
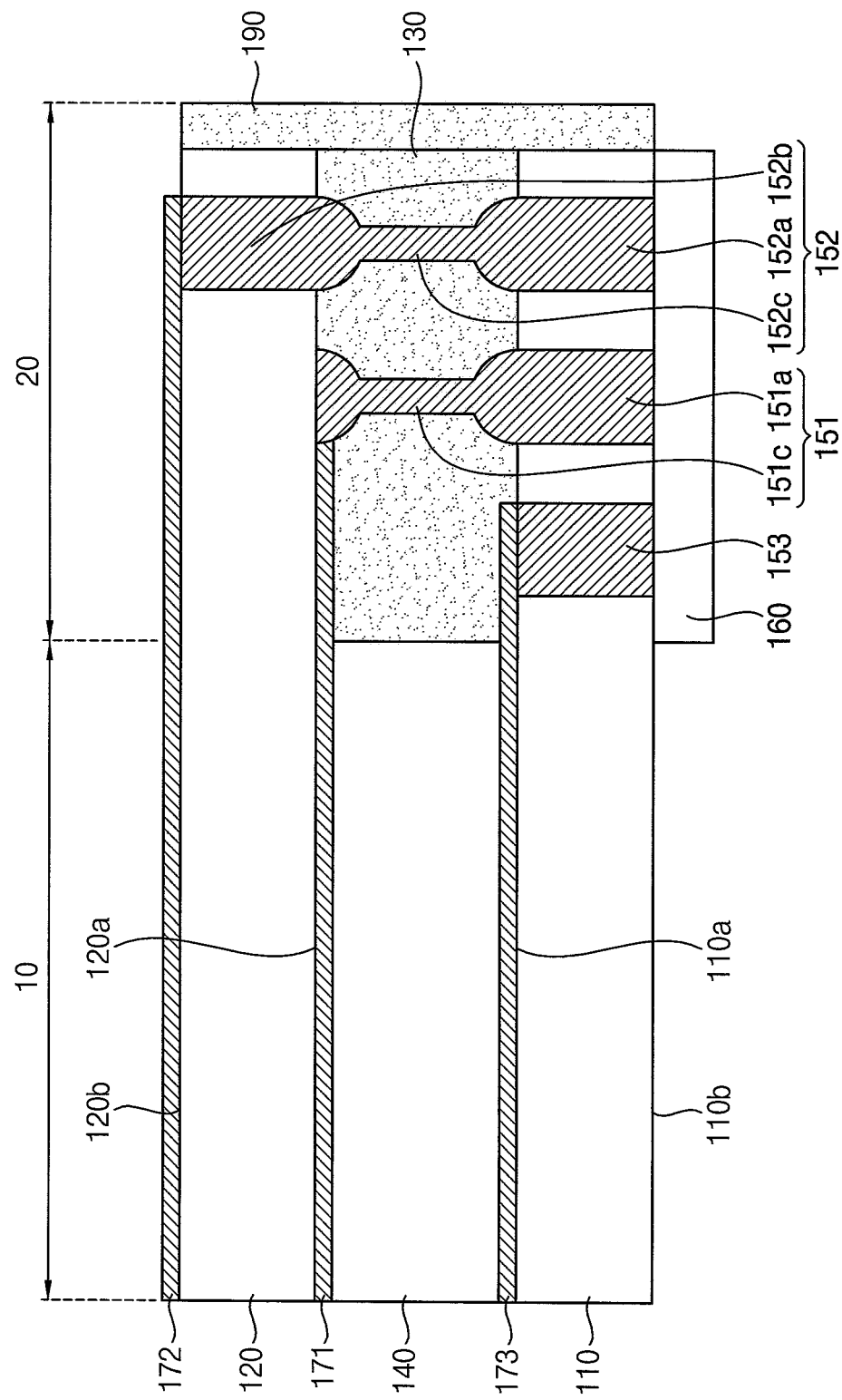

Referring to FIG. 14, the sealing member 130 may be formed in the sealing region 20 between the first substrate 110 and the second substrate 120, and the external sealing member 190 encapsulating side surfaces of the first substrate 110 and the second substrate 120 may be formed. Further, the driving circuit 160 connected to the first conductive member 151, the second conductive member 152, and the third conductive member 153 may be disposed.

The external sealing member 190 may be formed of a material substantially the same as or different from that of the sealing member 130. For example, the external sealing member 190 may be formed of an inorganic material, such as frit. The driving circuit 160 may be disposed on the second surface 110b of the first substrate 110.

In a method of manufacturing the display device according to an embodiment, the relatively small through holes may be formed in the relatively narrow sealing region 20 by the femtosecond laser, and the conductive members 151, 152, and 153 may be formed in the through holes. Accordingly, the display device having a relatively narrow bezel may be formed.

Herein, a display device according another embodiment will be described with reference to FIG. 15 and FIGS. 16A to 16C.

Figure 15:
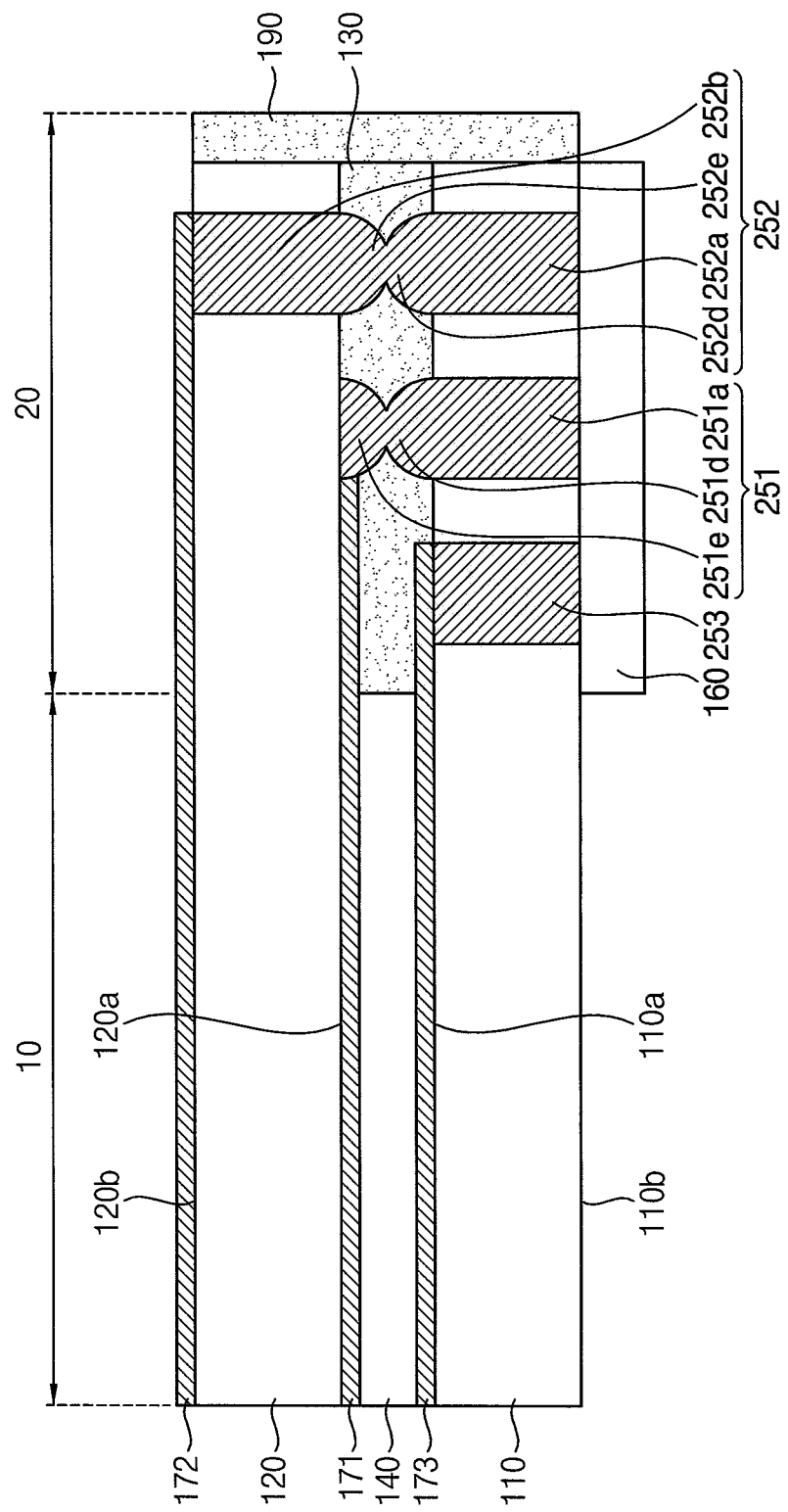
FIG. 15 is a cross-sectional view illustrating a display device according to another embodiment.

FIG. 15 is a cross-sectional view illustrating a display device according to another embodiment.

Referring to FIG. 15, a display device according to an embodiment may include the first substrate 110, the second substrate 120, the sealing member 130, the display member 140, the driving circuit 160, and conductive members 251, 252, and 253.

Descriptions of elements of the display device according to FIGS. 15 and 16, which are substantially the same as or similar to those of the display device described above with reference to FIGS. 2 to 4 will not be repeated.

A first conductive member 251 may include a first lower conductive member 251a passing through the first substrate 110 and a first middle conductive member (251d+251e) passing through the sealing member 130. The first middle conductive member (251d+251e) may include a first lower bump 251d being in contact with the first lower conductive member 251a and a first upper bump 251e being in contact with the end of the first wiring 171.

A second conductive member 252 may include a second lower conductive member 252a passing through the first substrate 110, an upper conductive member 252b passing through the second substrate 120, and a second middle conductive member (252d+252e) passing through the sealing member 130. The second middle conductive member (252d+252e) may include a second lower bump 252d being in contact with the second lower conductive member 252a and a second upper bump 252e being in contact with the upper conductive member 252b.

Figure 16A:
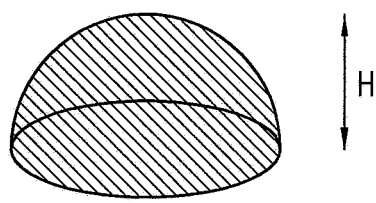
FIGS. 16A to 16C are schematic diagrams illustrating a bump formed in the display device in FIG. 15, according to various embodiments.
Figure 16B:
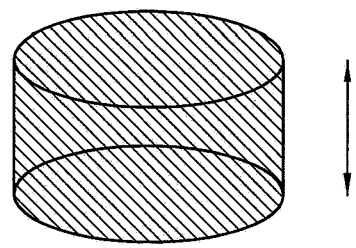
Figure 16C:
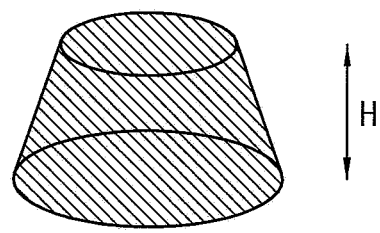

FIGS. 16A to 16C are schematic diagrams illustrating a bump formed in the display device in FIG. 15, according to various embodiments.

Referring to FIGS. 16A to 16C, each of the bumps 251d, 251e, 252d, and 252e may have any of various shapes, such as a hemisphere shape, like shown in FIG. 16A, a circular cylinder shape, like shown in FIG. 16B, a circular truncated cone shape, like shown in FIG. 16C, or the like. In an embodiment, a height H of each of the bumps 251d, 251e, 252d, and 252e may be in a range from about 1 µm to about 2 µm.

Herein, a method of manufacturing a display device such as the display device illustrated in FIG. 15 will be described in further detail with reference to FIGS. 17 to 19.

Figure 17:
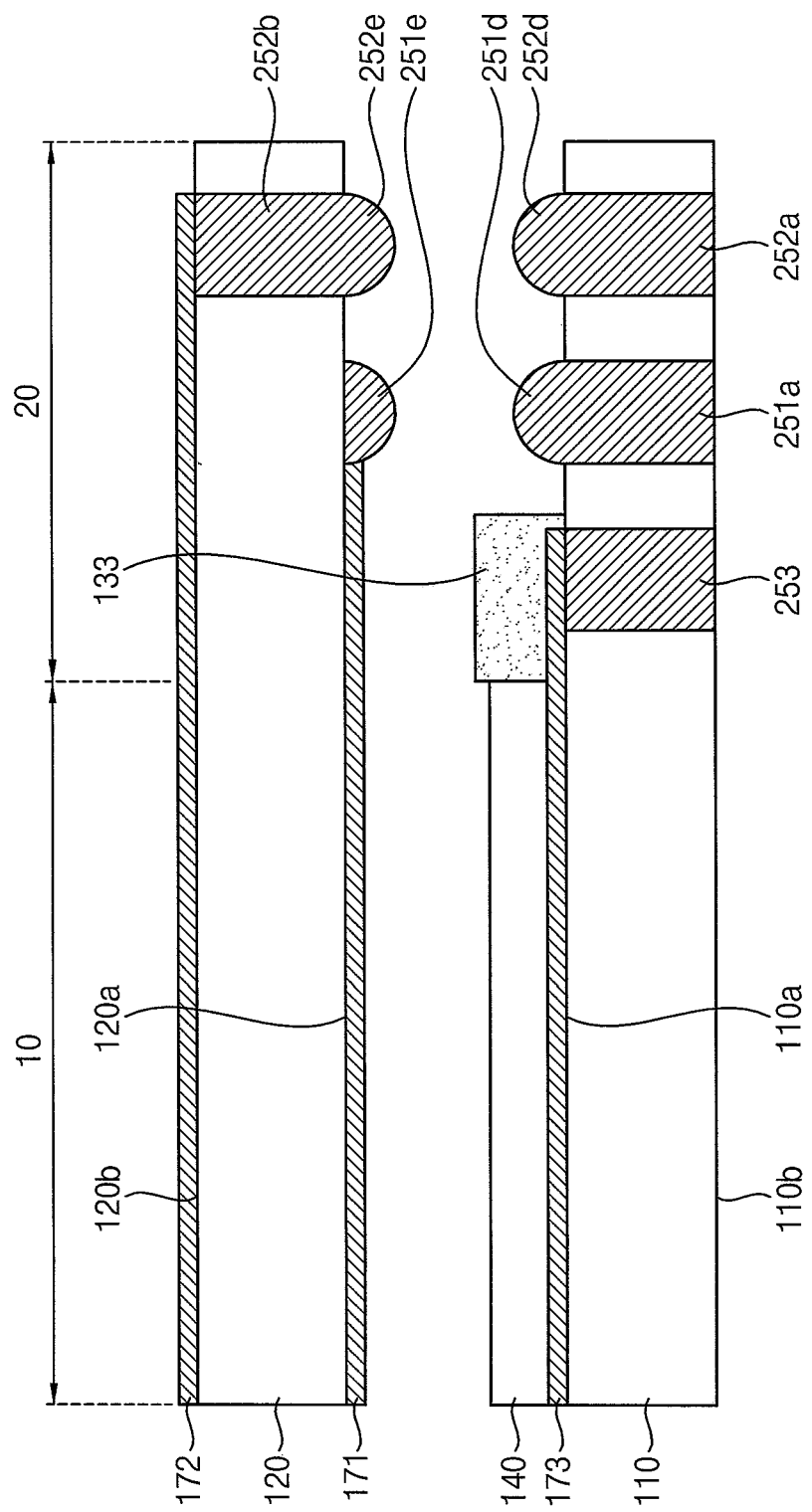
FIGS. 17 to 19 are cross-sectional views illustrating a method of manufacturing a display device, according to another embodiment.
Figure 18:
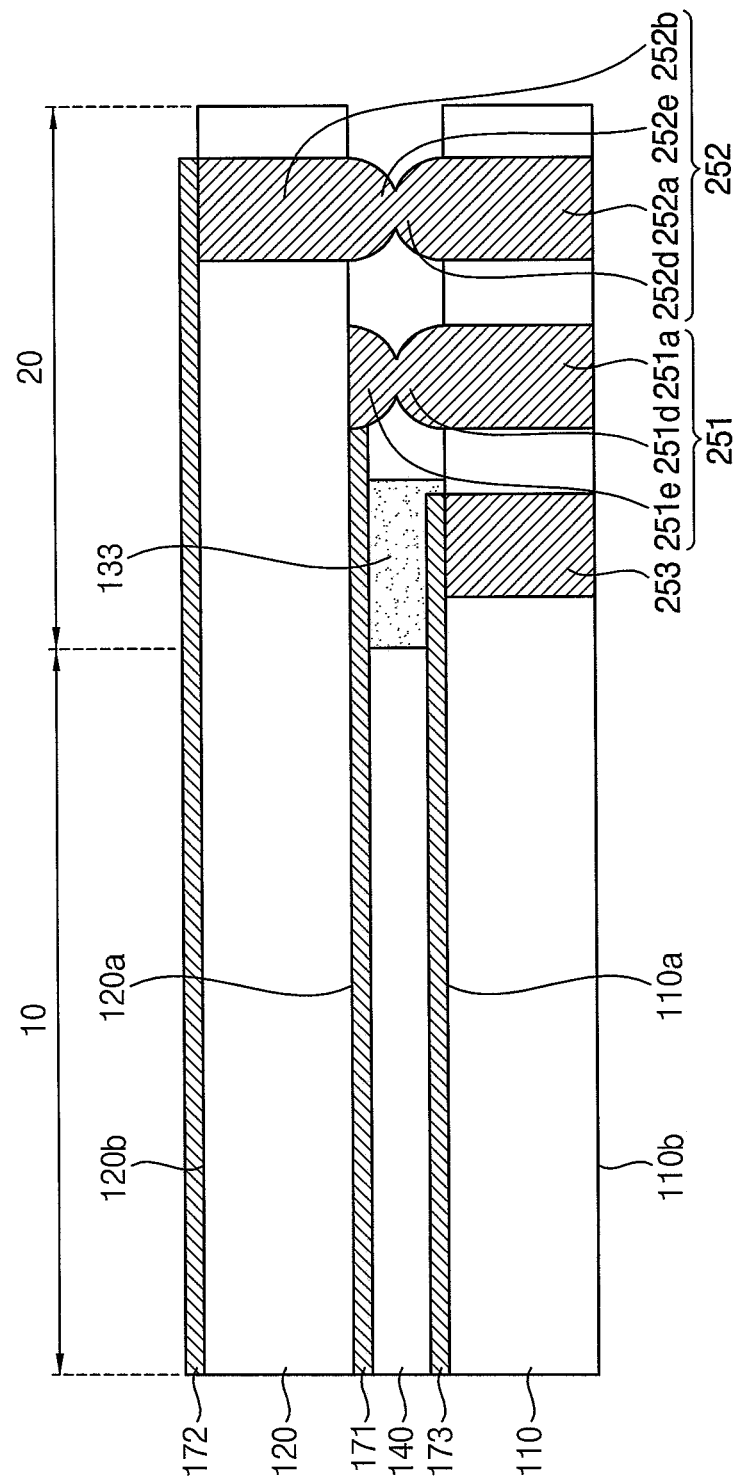
Figure 19:
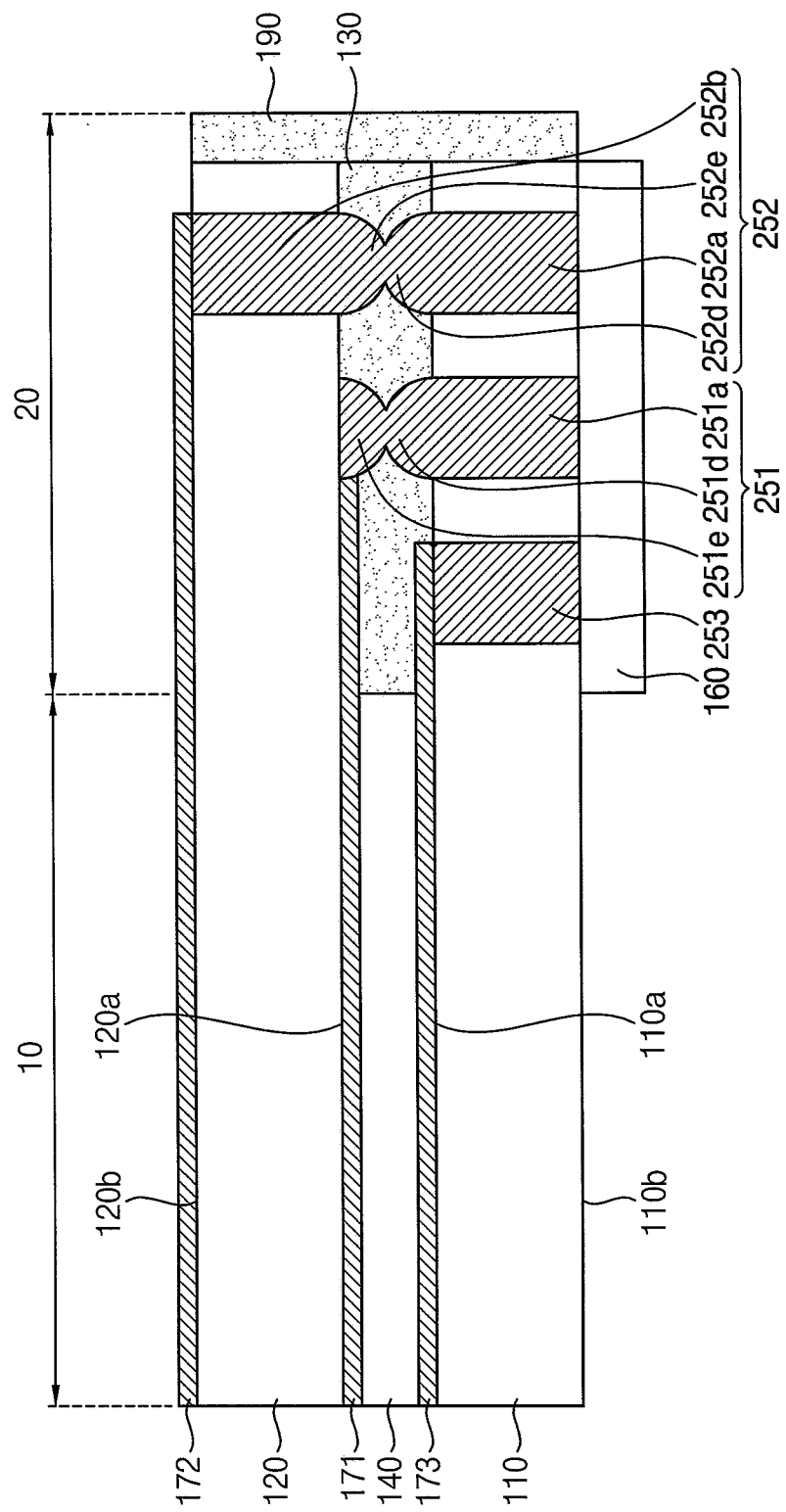

FIGS. 17 to 19 are cross-sectional views illustrating a method of manufacturing a display device, according to another embodiment.

A method of manufacturing a display device according to another embodiment may include forming a lower conductive member in a first substrate in a sealing region of the display device, forming a wiring on a second substrate, forming a middle conductive member in the sealing region between the first substrate and the second substrate, and forming a sealing member surrounding the middle conductive member.

Descriptions of elements of the method of manufacturing the display device according to the embodiment of FIGS. 17 to 19, which are substantially the same as or similar to those of the method of manufacturing the display device according to the embodiment described above with reference to FIGS. 5 to 14, will not be repeated.

Referring to FIG. 17, the second substrate 120 may be disposed opposite to the first substrate 110, and the bumps 251d, 251e, 252d, and 252e may be formed on the first substrate 110 and the second substrate 120. A preliminary sealing member 133 may be formed in the sealing region 20 between the first substrate 110 and the second substrate 120. The preliminary sealing member 133 may be a portion of the sealing member 130 illustrated in FIG. 15. Further, the display member 140 may be formed in the display region 10 between the first substrate 110 and the second substrate 120.

The first lower bump 251d and the second lower bump 252d may be formed on the first lower conductive member 251a and the second lower conductive member 252a on the first surface 110a of the first substrate 110, respectively. The first upper bump 251e and the second upper bump 252e may be formed on the end of the first wiring 171 and the upper conductive member 252b on the first surface 120a of the second substrate 120, respectively.

In an embodiment, each of the bumps 251d, 251e, 252d, and 252e may be formed of metal having flexibility, such as silver (Ag). In an embodiment, each of the bumps 251d, 251e, 252d, and 252e may be formed to have a thickness between about 1 μm to about 2 μm.

Referring to FIG. 18, the middle conductive members (251d+251e) and (252d+252e) respectively connecting the lower conductive members 251a and 252a and the wirings 171 and 172 may be formed in the sealing region 20 between the first substrate 110 and the second substrate 120. For example, the first middle conductive member (251d+251e) connecting the first lower conductive member 251a and the first wiring 171, and the second middle conductive member (252d+252e) connecting the second lower conductive member 252a and the second wiring 172 while being in contact with the upper conductive member 252b may be formed.

The first substrate 110 and the second substrate 120 may be combined such that the first lower bump 251d and the second lower bump 252d are in contact with the first upper bump 251e and the second upper bump 252e, respectively. Accordingly, the first conductive member 251 including the first lower conductive member 251a, the first lower bump 251d, and the first upper bump 251e; and the second conductive member 252 including the second lower conductive member 252a, the upper conductive member 252b, the second lower bump 252d, and the second upper bump 252e may be formed.

In an embodiment, a thickness of the display member 140 may be about 2 μm, and each of the bumps 251d, 251e, 252d, and 252e may be formed to have a thickness between about 1 μm to about 2 μm. Accordingly, the first conductive member 251 and the second conductive member 252 may be formed without influencing the display member 140.

Referring to FIG. 19, the sealing member 130 may be formed in the sealing region 20 between the first substrate 110 and the second substrate 120, and the external sealing member 190 encapsulating side surfaces of the first substrate 110 and the second substrate 120 may be formed. Further, the driving circuit 160 connected to the first conductive member 251, the second conductive member 252, and the third conductive member 253 may be disposed.

Herein, a display device according to another embodiment will be described with reference to FIG. 20.

Figure 20:
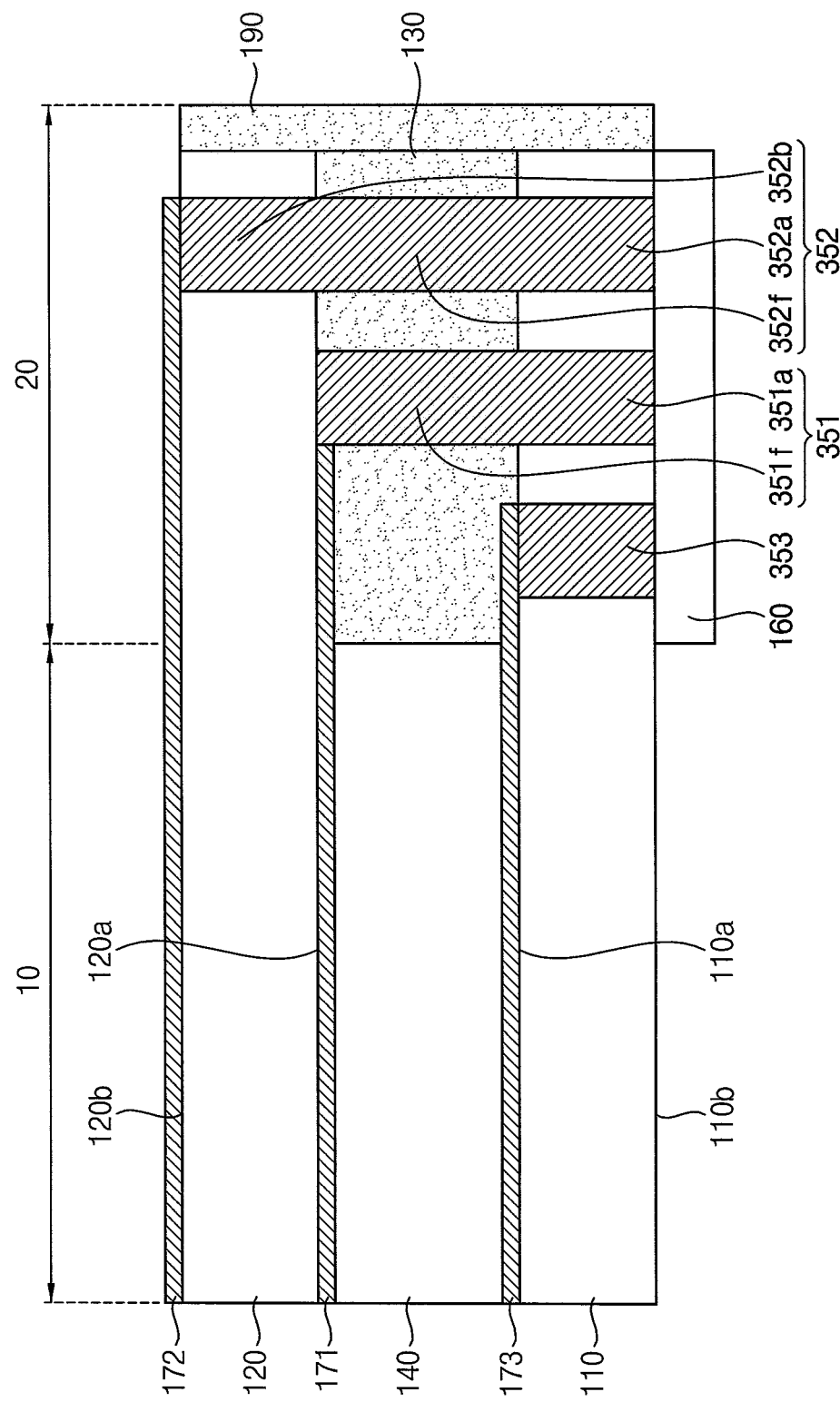
FIG. 20 is a cross-sectional view illustrating a display device according to another embodiment.

FIG. 20 is a cross-sectional view illustrating a display device according to another embodiment.

Referring to FIG. 20, a display device according to another embodiment may include the first substrate 110, the second substrate 120, the sealing member 130, the display member 140, the driving circuit 160, and conductive members 351, 352, and 353.

Descriptions of elements of the display device according to the embodiment of FIG. 20, which are substantially the same as or similar to those of the display device according to the embodiment described above with reference to FIGS. 2 to 4, will not be repeated.

A first conductive member 351 may include a first lower conductive member 351a passing through the first substrate 110 and a first middle conductive member 351f passing through the sealing member 130. In an embodiment, a width of the first middle conductive member 351f may be substantially the same as a width of the first lower conductive member 351a.

A second conductive member 352 may include a second lower conductive member 352a passing through the first substrate 110, an upper conductive member 352b passing through the second substrate 120, and a second middle conductive member 352f passing through the sealing member 130. In an embodiment, a width of the second lower conductive member 352a, a width of the upper conductive member 352b, and a width of the second middle conductive member 352f may be substantially the same.

Herein, a method of manufacturing a display device such as the display device illustrated in FIG. 20 will be described in further detail with reference to FIGS. 21 to 24.

FIGS. 21 to 24 are cross-sectional views illustrating a method of manufacturing a display device, according to another embodiment.

A method of manufacturing a display device according to another embodiment may include forming a lower conductive member in a first substrate in a sealing region of the display device, forming a wiring on a second substrate, forming a middle conductive member in the sealing region between the first substrate and the second substrate, and forming a sealing member surrounding the middle conductive member.

Descriptions of elements of the method of manufacturing the display device according to the embodiment of FIGS. 21 to 24, which are substantially the same as or similar to those of the method of manufacturing the display device according to the embodiment described above with reference to FIGS. 5 to 14, will not be repeated.

Figure 21:
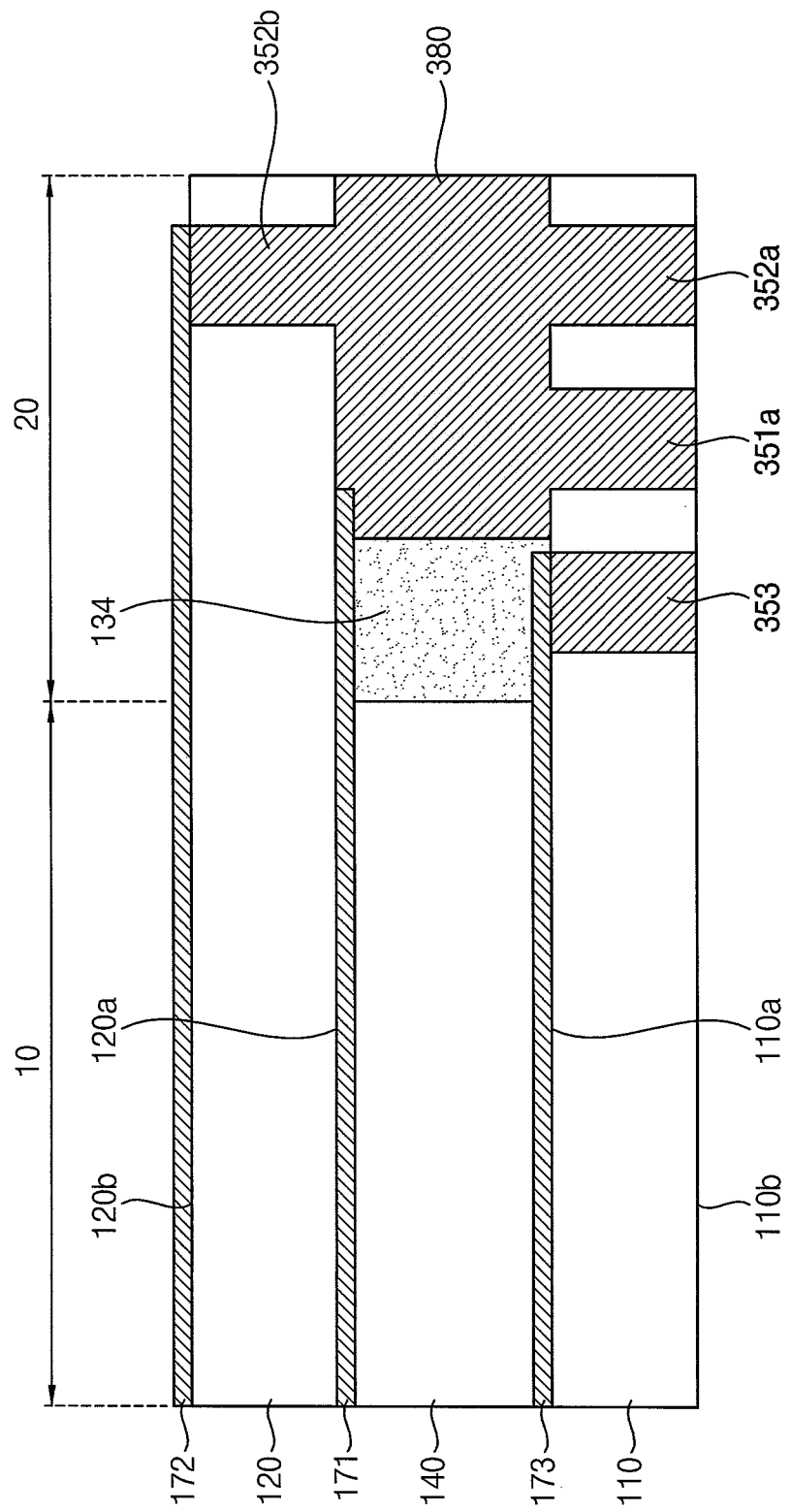
FIGS. 21 to 24 are cross-sectional views illustrating a method of manufacturing a display device, according to another embodiment.

Referring to FIG. 21, the second substrate 120 may be disposed opposite to the first substrate 110, a preliminary sealing member 134 may be formed in the sealing region 20 between the first substrate 110 and the second substrate 120, and a conductive structure 380 being in contact with the first lower conductive member 351a, the second lower conductive member 352a, the end of the first wiring 171, and the upper conductive member 352b may be formed in the sealing region 20 between the first substrate 110 and the second substrate 120. The preliminary sealing member 134 may be a portion of the sealing member 130 illustrated in FIG. 20.

The conductive structure 380 may be formed of a conductive material. For example, the conductive structure 380 may be formed of silver (Ag).

Figure 22:
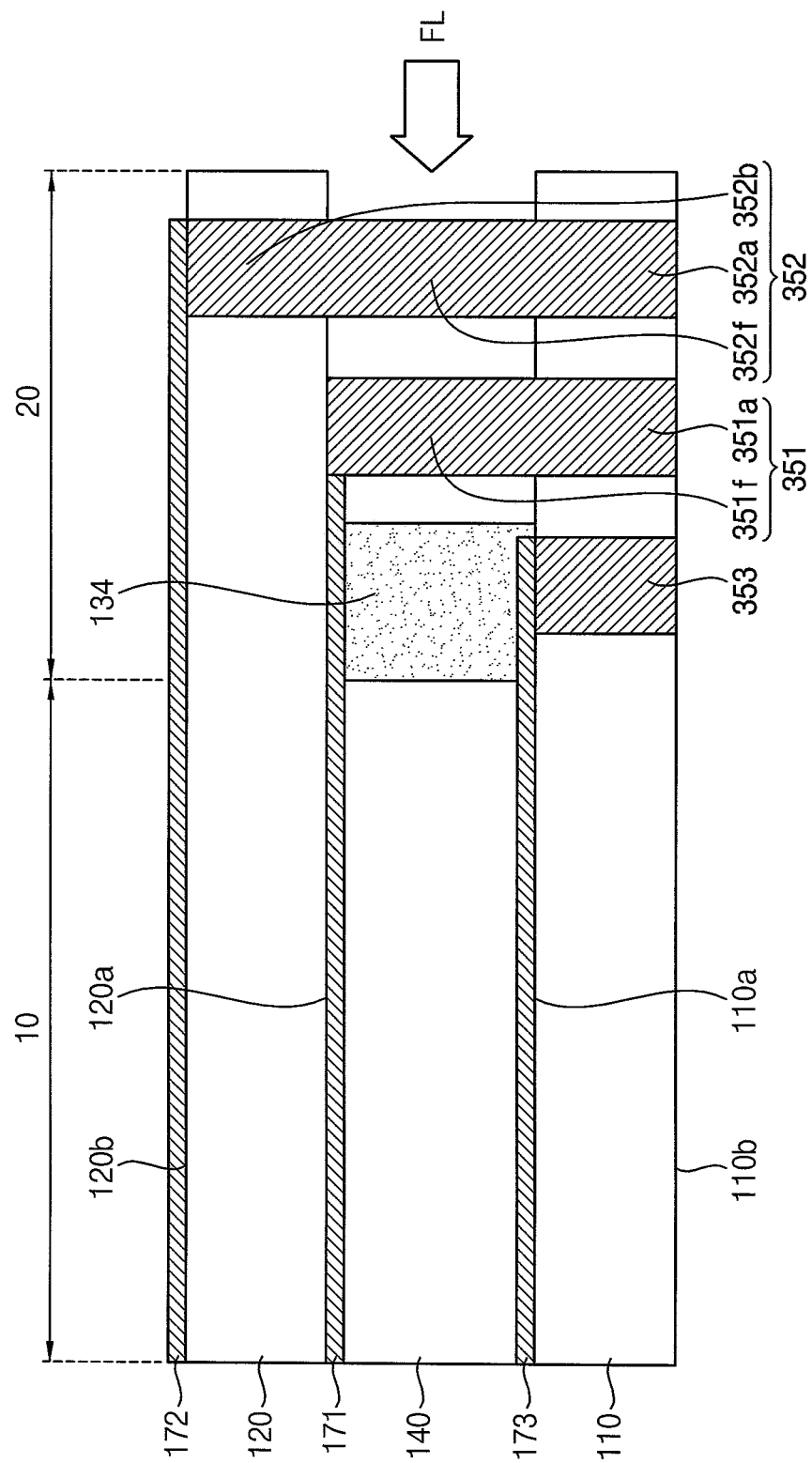
Figure 23:
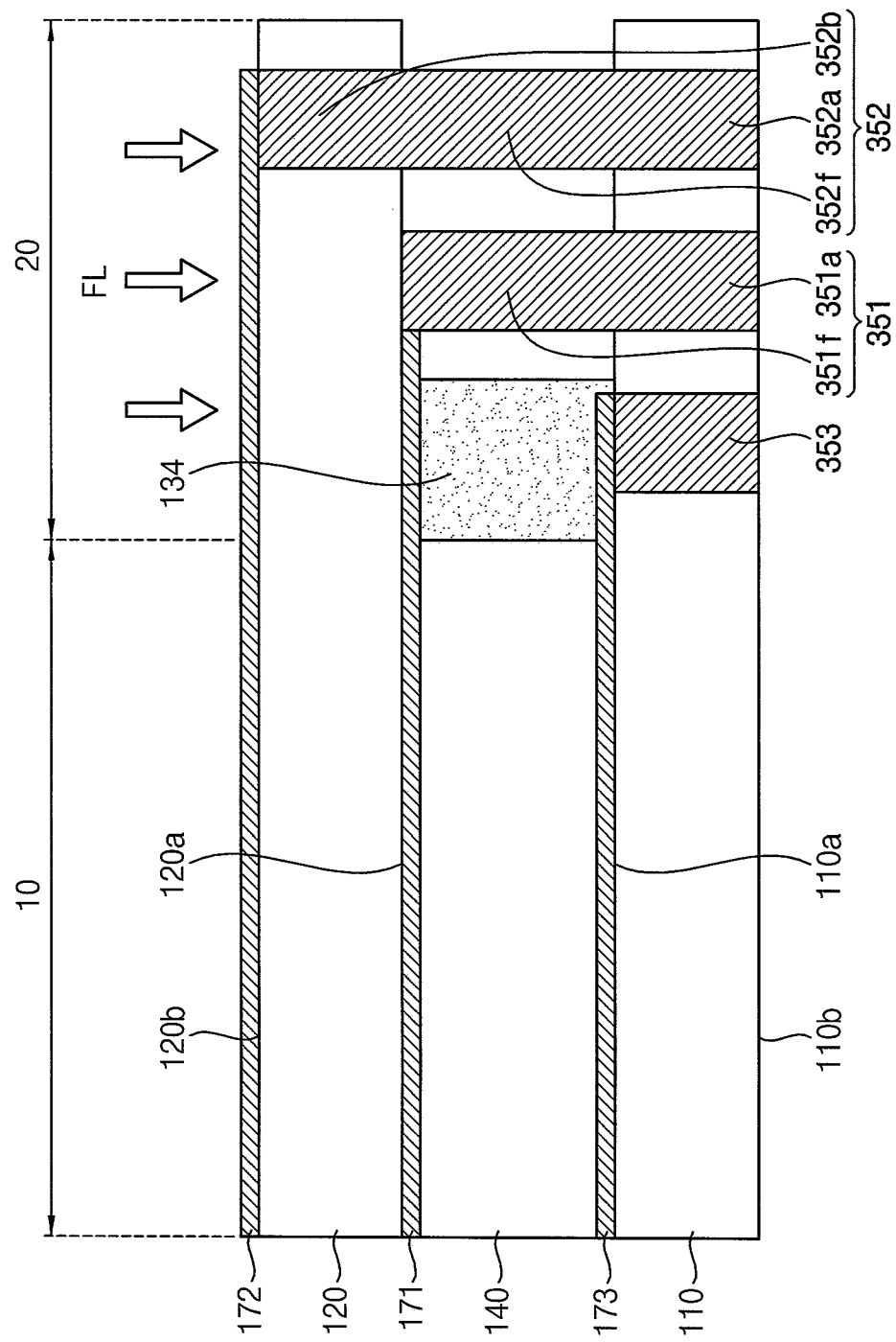

Referring to FIGS. 22 and 23, in an embodiment, the conductive structure 380 may be etched to form the first middle conductive member 351f and the second middle conductive member 352f.

In an embodiment, the conductive structure 380 may be etched by irradiating a laser FL. In an embodiment, the laser FL may be irradiated from a side portion of the display device to etch the conductive structure 380, as illustrated in FIG. 22.

In another embodiment, the laser FL may be irradiated from an upper portion or a lower portion of the display device to etch the conductive structure 380, as illustrated in FIG. 23. In this case, the first substrate 110 or the second substrate 120 may include a material transmitting the laser FL.

Figure 24:
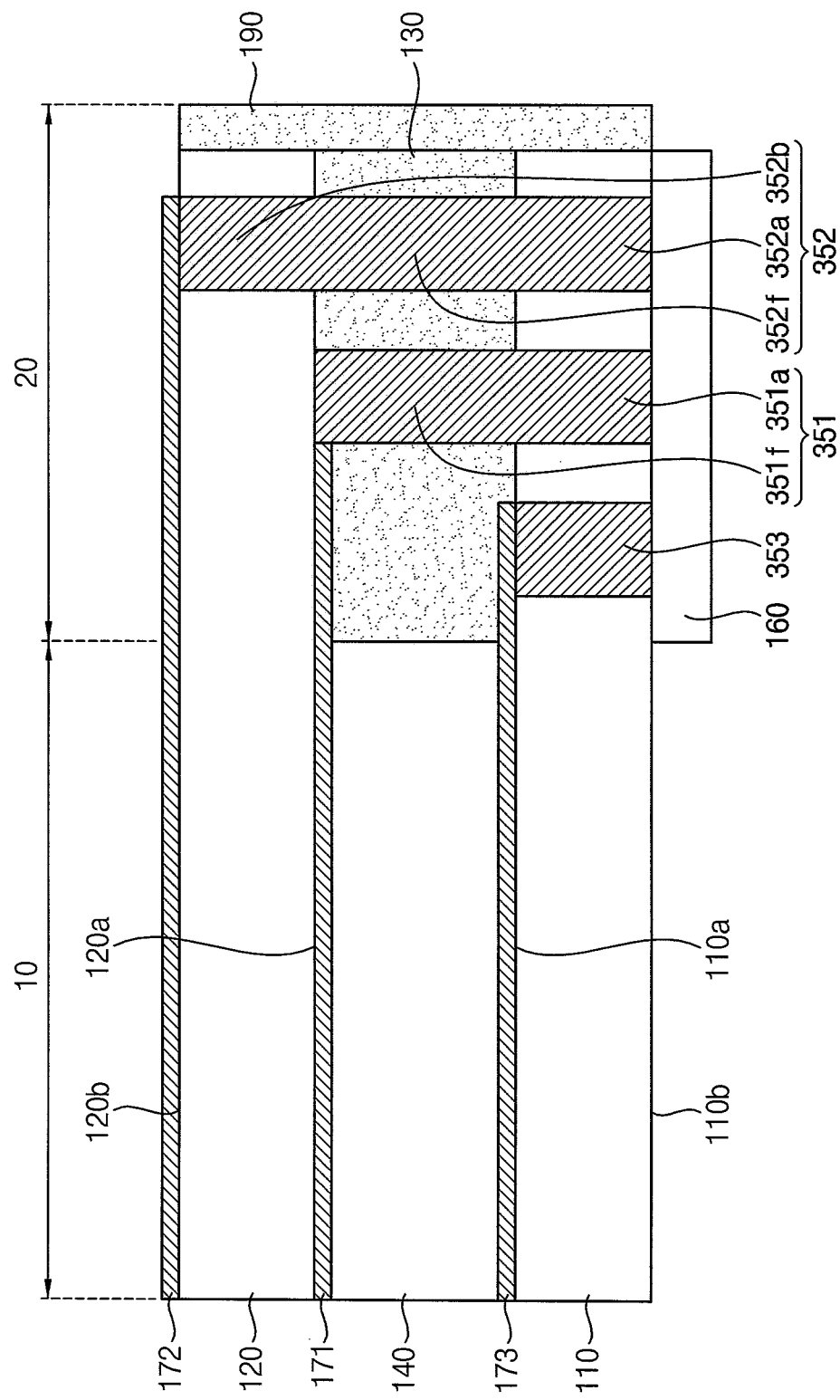

Referring to FIG. 24, the sealing member 130 may be formed in the sealing region 20 between the first substrate 110 and the second substrate 120, and the external sealing member 190 encapsulating the side surfaces of the first substrate 110 and the second substrate 120 may be formed. Further, the driving circuit 160 connected to the first conductive member 351, the second conductive member 352, and the third conductive member 353 may be disposed.

The display device according to embodiments of the present disclosure may be applied to a display device included in a computer, a notebook, a mobile phone, a smartphone, a smart pad, a PMP, a PDA, an MP3 player, or the like.

Although the display devices and the method of manufacturing the display devices according to some embodiments of the present disclosure have been described with reference to the drawings, the illustrated embodiments are examples, and may be modified and changed by a person having ordinary knowledge in the relevant technical field without departing from the technical spirit of the present disclosure set forth in the following claims.

What is claimed is:

1. A display device comprising:
   a display region and a sealing region;
   a first substrate;
   a second substrate opposite to the first substrate;
   a sealing member in the sealing region between the first substrate and the second substrate, the sealing member extending from a surface of the first substrate facing the second substrate to a surface of the second substrate facing the first substrate; and
   a first conductive member overlapping the sealing member and passing through the first substrate and the sealing member.

2. The display device of claim 1, further comprising a driving circuit on a surface of the first substrate opposite to the surface facing the second substrate, the driving circuit being connected to the first conductive member.

3. The display device of claim 1, wherein the first conductive member is connected to a wiring on the surface of the second substrate facing the first substrate, the wiring extending from the display region to the sealing region.

4. The display device of claim 3, wherein the wiring is a common voltage line.

5. The display device of claim 1, further comprising a second conductive member overlapping the sealing member and passing through the first substrate, the sealing member, and the second substrate.

6. The display device of claim 5, wherein the second conductive member is connected to a wiring on a surface of the second substrate opposite to the surface facing the first substrate, the wiring extending from the display region to the sealing region.

7. The display device of claim 6, wherein the wiring is a touch line.

8. The display device of claim 5, further comprising a third conductive member overlapping the sealing member and passing through the first substrate.

9. The display device of claim 8, wherein the third conductive member is connected to a wiring on the surface of the first substrate facing the second substrate, the wiring extending from the display region to the sealing region.

10. The display device of claim 9, wherein the wiring is a gate line or a data line.

11. A method of manufacturing a display device, the method comprising:
    forming a lower conductive member in a first substrate in a sealing region of the display device;
    forming a wiring on a second substrate opposite to the first substrate, the wiring extending from a display region of the display device to the sealing region;
    forming a middle conductive member connecting the lower conductive member and the wiring in the sealing region between the first substrate and the second substrate; and
    forming a sealing member surrounding the middle conductive member in the sealing region between the first substrate and the second substrate, the sealing member extending from a surface of the first substrate facing the second substrate to a surface of the second substrate facing the first substrate,
    wherein a first conductive member comprising the lower conductive member and the middle conductive member overlaps with the sealing member and passes through the first substrate and the sealing member.

12. The method of claim 11, further comprising providing a driving circuit connected to the lower conductive member on a surface of the first substrate opposite to the surface facing the second substrate.

13. The method of claim 11, wherein forming the lower conductive member comprises:
    forming a through hole in the first substrate in the sealing region; and
    filling the through hole with a conductive material.

14. The method of claim 13, wherein the through hole is formed by a femtosecond laser.

15. The method of claim 11, wherein forming the middle conductive member comprises connecting the lower conductive member and the wiring with a conductive line.

16. The method of claim 11, wherein forming the middle conductive member comprises:
    forming bumps on the lower conductive member and the wiring, respectively; and
    contacting the bumps to each other.

17. The method of claim 11, wherein forming the middle conductive member comprises:
    forming a conductive structure in the sealing region between the first substrate and the second substrate; and
    etching the conductive structure so as to form the middle conductive member.

18. The method of claim 11, further comprising forming an upper conductive member in the second substrate in the sealing region.

19. The method of claim 18, wherein forming the upper conductive member comprises:
    forming a through hole in the second substrate in the sealing region; and
    filling the through hole with a conductive material.

20. The method of claim 19, wherein the through hole is formed by a femtosecond laser.

* * * * *